(12) United States Patent
Onodera et al.

(10) Patent No.: US 8,802,761 B2
(45) Date of Patent: Aug. 12, 2014

(54) π-CONJUGATED POLYMER COMPOSITION

(75) Inventors: Shingo Onodera, Sodegaura (JP);
Norihiro Kuroda, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 134 days.

(21) Appl. No.: 13/377,672

(22) PCT Filed: Jun. 14, 2010

(86) PCT No.: PCT/JP2010/003922
§ 371 (c)(1),
(2), (4) Date: Jan. 9, 2012

(87) PCT Pub. No.: WO2010/143450
PCT Pub. Date: Dec. 16, 2010

(65) Prior Publication Data
US 2012/0135255 A1   May 31, 2012

(30) Foreign Application Priority Data

Jun. 12, 2009  (JP) ................ 2009-140715
Sep. 4, 2009   (JP) ................ 2009-204330
Dec. 25, 2009  (JP) ................ 2009-294855
Mar. 23, 2010  (JP) ................ 2010-066496

(51) Int. Cl.
*B32B 27/28* (2006.01)
*C08L 79/02* (2006.01)
*H01G 9/028* (2006.01)
*C08K 5/13* (2006.01)
*C08G 73/02* (2006.01)
*C08K 5/42* (2006.01)

(52) U.S. Cl.
CPC ......... *C08L 79/02* (2013.01); *C08G 2261/3221* (2013.01); *H01G 9/028* (2013.01); *C08G 2261/3223* (2013.01); *C08K 5/13* (2013.01); *C08G 2261/792* (2013.01); *C08G 73/0266* (2013.01); *C08K 5/42* (2013.01)
USPC ......... 524/421; 428/500; 252/500; 252/519.2

(58) Field of Classification Search
USPC .................................... 524/421
See application file for complete search history.

(56) References Cited

U.S. PATENT DOCUMENTS

| | | |
|---|---|---|
| 5,736,623 A | 4/1998 | Angelopoulos et al. |
| 5,804,100 A | 9/1998 | Angelopoulos et al. |
| 5,962,632 A | 10/1999 | Angelopoulos et al. |
| 5,990,249 A | 11/1999 | Angelopoulos et al. |
| 6,005,070 A | 12/1999 | Angelopoulos et al. |
| 6,087,472 A | 7/2000 | Angelopoulos et al. |
| 6,255,450 B1 | 7/2001 | Angelopoulos et al. |
| 6,312,620 B1 | 11/2001 | Angelopoulos et al. |
| 6,752,935 B2 | 6/2004 | Angelopoulous et al. |
| 6,806,349 B2 | 10/2004 | Angelopoulous et al. |
| 7,351,357 B2 | 4/2008 | Blanchet-Fincher et al. |
| 7,771,621 B2 | 8/2010 | Kuramoto |
| 2005/0116202 A1 | 6/2005 | Gao et al. |
| 2007/0108420 A1* | 5/2007 | Kuramoto ............... 252/500 |

FOREIGN PATENT DOCUMENTS

| | | |
|---|---|---|
| JP | 4 139257 | 5/1992 |
| JP | 7 238149 | 9/1995 |
| JP | 8 231862 | 9/1996 |
| JP | 2005 526876 | 9/2005 |
| JP | 2007 224279 | 9/2007 |
| JP | 2008 260896 | 10/2008 |
| WO | 2005 052058 | 6/2005 |
| WO | 2008 018420 | 2/2008 |
| WO | 2008 038609 | 4/2008 |

OTHER PUBLICATIONS

International Search Report Issued Aug. 3, 2010 in PCT/JP10/03922 Filed Jun. 14, 2010.

* cited by examiner

*Primary Examiner* — Doris Lee
(74) *Attorney, Agent, or Firm* — Oblon, Spivak, McClelland, Maier & Neustadt, L.L.P.

(57) ABSTRACT

A π-conjugated polymer composition including: (a) a solvent; (b) a π-conjugated polymer which is dissolved in the solvent and doped with a dopant; (c) at least one of an acidic substance and a salt of an acidic substance; and (d) a phenolic compound; wherein when only the acidic substance is contained as the component (c), the acidic substance is different from the phenolic compound, when only the salt of an acidic substance is contained, the salt of an acidic substance is different from the phenolic compound, and when both the acidic substance and the salt of an acidic substance are contained, at least one of the acidic substance and the salt of an acidic substance is different from the phenolic compound.

30 Claims, 2 Drawing Sheets

π-CONJUGATED POLYMER COMPOSITION

TECHNICAL FIELD

The invention relates to a π-conjugated polymer composition.

BACKGROUND ART

A conductive polymer is used in a wide variety of industrial fields including an electrolytic capacitor, an organic light-emitting diode, an antistatic film and a touch panel.

Polyaniline, one of conductive polymers, has advantages that, in addition to its electric properties, it can be synthesized easily from inexpensive aniline and show improved stability to oxygen or the like in a conductive state. Further, highly-conductive polyaniline can be obtained easily by a method mentioned in Patent Document 1. Here, the polyaniline composition disclosed in Patent Document 1 is a solution type polyaniline composition in which doped polyaniline is dissolved in a solvent.

However, the thermal resistance of the conductive polyaniline composition disclosed in Patent Document 1 is not necessarily high, and has a problem that the resistance thereof increases by about 10 times as compared with the initial value if it is allowed to stand in an inactive gas at 105° C. for 10 days, for example.

On the other hand, a dispersion type polyaniline composition in which doped polyaniline is not dissolved is also known. Further, it is known that heat resistance is improved by using sulfonic acid as a dopant (Patent Document 2). However, a dispersion type polyaniline composition has a defect that the resulting molded article is weak if solid matters thereof are composed only of polyaniline fine particles.

In order to solve this problem, it is also known to add a binder resin which is a solid matter other than polyaniline. However, since a binder resin is an insulator, another problem occurs that the conductivity of the resulting molded article is decreased.

Further, in a dispersion type polyaniline composition, since doped polyaniline fine particles are agglomerated and precipitated, when a molded article is produced by using this dispersion type polyaniline composition, a problem arises that this composition has to be mixed during the production to allow polyaniline fine particles to be dispersed in the composition.

It is also known that the heat resistance is increased by adding sulfonic acid to a dispersion type polyaniline composition (Patent Document 3). However, since the polyaniline composition disclosed in Patent Document 3 is of dispersion type, it suffers from the same problem as mentioned above. Further, a molded article produced by using a "conductive composition obtained by adding sulfonic acid to dispersion type polyaniline" disclosed in Patent Document 3 has a significantly lowered conductivity as compared with a molded article produced by using a "conductive composition obtained without adding sulfonic acid".

RELATED ART DOCUMENTS

Patent Documents

Patent Document 1: WO2005/052058
Patent Document 2: JP-A-H07-238149
Patent Document 3: JP-T-2005-526876

SUMMARY OF THE INVENTION

An object of the invention is to provide a soluble polymer composition having high conductivity and high heat resistance in which a π-conjugated polymer is dissolved in a solvent.

According to the invention, the following π-conjugated polymer composition or the like are provided.

The first π-conjugated polymer composition of the invention comprising:
(a) a solvent;
(b) a π-conjugated polymer which is dissolved in the solvent and doped with a dopant;
(c) at least one of an acidic substance and a salt of an acidic substance; and
(d) a phenolic compound;
wherein when only the acidic substance is contained as the component (c), the acidic substance is different from the phenolic compound, when only the salt of an acidic substance is contained as the component (c), the salt of an acidic substance is different from the phenolic compound, and when both the acidic substance and the salt of an acidic substance are contained as the component (c), at least one of the acidic substance and the salt of an acidic substance is different from the phenolic compound.

The second π-conjugated polymer composition obtained by using at least the following components (a) to (d) as starting materials:
(a) a solvent;
(b) a π-conjugated polymer which is dissolved in the solvent and doped with a dopant;
(c) at least one of an acidic substance and a salt of an acidic substance; and
(d) a phenolic compound;
wherein when only the acidic substance is contained as the component (c), the acidic substance is different from the phenolic compound, when only the salt of an acidic substance is contained as the component (c), the salt of an acidic substance is different from the phenolic compound, and when both the acidic substance and the salt of an acidic substance are contained as the component (c), at least one of the acidic substance and the salt of an acidic substance is different from the phenolic compound.

As for the first π-conjugated polymer composition and the second π-conjugated polymer composition of the invention, it is preferred that, when only the acidic substance is contained as the component (c), the acidic substance be different from the dopant, when only the salt of an acidic substance is contained as the component (c), the salt of an acidic substance be different from the dopant, and when both the acidic substance and the salt of an acidic substance are contained as the component (c), at least one of the acidic substance and the salt of an acidic substance be different from the dopant.

As for the first π-conjugated polymer composition and the second π-conjugated polymer composition of the invention, the following is preferable:
when only the acidic substance is contained as the component (c), the acidic substance has an acidity of 5.0 or less;
when only the salt of an acidic substance is contained as the component (c), the acidic substance of the salt has an acidity of 5.0 or less; and
when both the acidic substance and the salt of an acidic substance are contained as the component (c), at least one of a condition that the acidic substance has an acidity of 5.0 or less and a condition that the acidic substance of the salt has an acidity of 5.0 or less is satisfied.

As for the first π-conjugated polymer composition and the second π-conjugated polymer composition of the invention, it is preferred that the π-conjugated polymer comprise nitrogen atom; the dopant be a sulfonic acid;

when only the acidic substance is contained as the component (c), the acidic substance be a sulfonic acid which is the same as or different from the dopant;

when only the salt of an acidic substance is contained as the component (c), the salt of an acidic substance be a salt of a sulfonic acid which is the same as or different from the dopant; when the acidic substance and the salt of an acidic substance are contained as the component (c), at least one of the acidic substance and the salt of an acidic substance be a sulfonic acid or a salt of a sulfonic acid which is the same as or different from the dopant; and the following formula (1) be satisfied:

$$0.21 \leq S_1/N_1 \leq 1.2 \tag{1}$$

wherein $S_1$ is the mole number of sulfur atom contained in the composition and $N_1$ is the mole number of nitrogen atom contained in the composition.

As for the first π-conjugated polymer composition and the second π-conjugated polymer composition of the invention, it is preferred that the π-conjugated polymer comprise nitrogen atom;

the dopant be a sulfonic acid;

when only the acidic substance is contained as the component (c), the acidic substance be a sulfonic acid which is the same as or different from the dopant;

when only the salt of an acidic substance is contained as the component (c), the salt of an acidic substance be a salt of a sulfonic acid which is the same as or different from the dopant; when the acidic substance and the salt of an acidic substance are contained as the component (c), at least one of the acidic substance and the salt of an acidic substance be a sulfonic acid or a salt of a sulfonic acid which is the same as or different from the dopant;

when only the acidic acid is contained as the component (c), the formula (2) be satisfied;

when only the salt of an acidic substance is contained as the component (c), the formula (3) be satisfied; and when the acidic substance and the salt of an acidic substance are contained, the formula (4) be satisfied:

$$0.01 \leq S_2/N_2 \leq 0.5 \tag{2}$$

$$0.01 \leq S_3/N_3 \leq 0.5 \tag{3}$$

$$0.01 \leq S_4/N_4 \leq 0.5 \tag{4}$$

wherein $S_2$ is the total mole number of sulfur atom contained in all of acidic substance(s) contained in the composition; $S_3$ is the total mole number of sulfur atom contained in all of salt(s) of acidic substance(s) contained in the composition, and $S_4$ is the total mole number of sulfur atom contained in all of acidic substance(s) and salt(s) of acidic substance(s) contained in the composition, and $N_2$ to $N_4$ are the total mole number of nitrogen atom of all π-conjugated polymer(s) doped with dopant(s) contained in the composition.

As for the first π-conjugated polymer composition and the second π-conjugated polymer composition of the invention, it is preferred that the π-conjugated polymer comprise nitrogen atom, the dopant be a sulfonic acid and the formula (5) be satisfied:

$$0.2 \leq S_5/N_5 \leq 0.7 \tag{5}$$

wherein $S_5$ is the total mole number of sulfur atoms of the π-conjugated polymer which is doped with the dopant and $N_5$ is the total mole number of nitrogen atom of the π-conjugated polymer which is doped with the dopant.

As for the first π-conjugated polymer composition and the second π-conjugated polymer composition of the invention, it is preferred that the conductivity measured by a four probe method of a molded article of the π-conjugated polymer which is doped with the dopant be 0.01 S/cm or more and the molded article be obtained by applying 1 ml of a solution obtained by dissolving 500 mg of the π-conjugated polymer doped with the above-mentioned dopant in 10 g of toluene by spin coating at 500 rpm for 15 seconds in a nitrogen atmosphere on a glass substrate with a patterned indium tin oxide electrode thereon, followed by drying at 80° C. for 5 minutes in a nitrogen atmosphere.

As for the first π-conjugated polymer composition and the second π-conjugated polymer composition of the invention, it is preferred that the conductivity measured by a four probe method of a molded article is 0.01 S/cm or more and the molded article be obtained by applying 1 ml of the π-conjugated polymer composition by spin coating at 500 rpm for 15 seconds in a nitrogen atmosphere on a glass substrate with a patterned indium tin oxide electrode thereon, followed by drying at 80° C. for 5 minutes in a nitrogen atmosphere.

As for the first π-conjugated polymer composition and the second π-conjugated polymer composition according to the invention, it is preferred that the doped π-conjugated polymer be a substituted or unsubstituted polyaniline which is protonated.

As for the first π-conjugated polymer composition and the second π-conjugated polymer composition of the invention, it is preferred that the doped π-conjugated polymer be a substituted or unsubstituted polyaniline which is protonated by a sulfonic acid.

As for the first π-conjugated polymer composition and the second π-conjugated polymer composition according to the invention, it is preferred that the sulfonic acid be a sulfosuccinic acid derivative represented by the following formula (III):

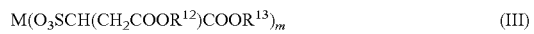

$$M(O_3SCH(CH_2COOR^{12})COOR^{13})_m \tag{III}$$

wherein M is a hydrogen atom, an organic free radical or an inorganic free radical, m is a valency of M; and $R^{12}$ and $R^{13}$ are independently a hydrocarbon group or a group represented by $—(R^{14}O)_r—R^{15}$ wherein $R^{14}$ is a hydrocarbon group or a silylene group, $R^{15}$ is a hydrogen atom, a hydrocarbon group or a group represented by $R^{16}{}_3Si—$ wherein $R^{16}$ is a hydrocarbon group and three $R^{16}$s may be the same or different, and r is an integer of 1 or more.

In the first π-conjugated polymer composition and the second π-conjugated polymer composition according to the invention, it is preferred that the acidic substance is an organic acid.

As for the first π-conjugated polymer composition and the second π-conjugated polymer composition according to the invention, it is preferred that the acidic substance or the salt of an acidic substance be one or more acidic substances having one or more acidic groups selected from a sulfonic acid group, a phosphoric acid group, a phosphonic acid group and a carboxy group, or one or more salts thereof.

As for the first π-conjugated polymer composition and the second π-conjugated polymer composition according to the invention, it is preferred that the acidic substance be a cyclic, chain or branched alkyl acid having one or more acidic groups.

As for the first π-conjugated polymer composition and the second π-conjugated polymer composition according to the invention, it is preferred that the acidic substance be a substituted or unsubstituted aromatic acid having one or more acidic groups.

As for the first π-conjugated polymer composition and the second π-conjugated polymer composition according to the invention, it is preferred that the aromatic acid be an acid having a naphthalene skeleton.

As for the first π-conjugated polymer composition and the second π-conjugated polymer composition according to the invention, it is preferred that
the phenolic compound be a phenolic compound represented by the following formula (1):

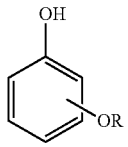

(1)

wherein R is an alkyl group having 1 to 20 carbon atoms, an alkenyl group having 1 to 20 carbon atoms, a cycloalkyl group having 1 to 20 carbon atoms, an alkylthio group having 1 to 20 carbon atoms, an aryl group having 1 to 20 carbon atoms, an alkylaryl group having 1 to 20 carbon atoms or an arylalkyl group having 1 to 20 carbon atoms.

As for the first π-conjugated polymer composition and the second π-conjugated polymer composition according to the invention, it is preferred that the phenolic compound be a phenolic compound represented by the following formula (2):

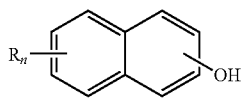

(2)

wherein n is an integer of 0 to 6 and R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms, an aryl group having 6 to 20 carbon atoms, an alkylaryl group having 6 to 20 carbon atoms or an arylalkyl group having 6 to 20 carbon atoms.

As for the first π-conjugated polymer composition and the second π-conjugated polymer composition according to the invention, it is preferred that
the phenolic compound be a phenolic compound represented by the following formula (3):

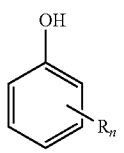

(3)

wherein n is an integer of 1 to 5 and R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms, an aryl group having 6 to 20 carbon atoms, an alkylaryl group having 6 to 20 carbon atoms or an arylalkyl group having 6 to 20 carbon atoms.

The first capacitor of the invention comprises the first π-conjugated polymer composition of the invention or the second π-conjugated polymer composition of the invention.

The second capacitor of the invention is produced by using the first π-conjugated polymer composition of the invention or the second π-conjugated polymer composition of the invention.

The conductive molded article of the invention is obtained by shaping the first π-conjugated polymer composition of the invention or the second π-conjugated polymer composition of the invention.

The conductive film of the invention is obtained by forming the first π-conjugated polymer composition of the invention or the second π-conjugated polymer composition of the invention.

The surface-conductive product of the invention is obtained by applying to a substrate the first π-conjugated polymer composition of the invention or the second π-conjugated polymer composition of the invention.

As for the surface-conductive product of the invention, it is preferred that the substrate be a resin film.

The conductive product of the invention is obtained by mixing the first π-conjugated polymer composition of the invention or the second π-conjugated polymer composition of the invention.

The third π-conjugated polymer composition of the invention comprises doped π-conjugated polymer, an acidic substance or a salt of an acidic substance, and a phenolic compound, wherein the doped π-conjugated polymer is a substituted or unsubstituted polyaniline which is protonated by a sulfosuccinic acid, and the acidic substance is an acid which has a sulfonic acid group and a naphthalene skeleton.

According to the invention, it is possible to provide a soluble polymer composition having a high conductivity and a high heat resistance, in which a π-conjugated polymer is dissolved in a solvent.

MODE FOR CARRYING OUT THE INVENTION

Figure 1:
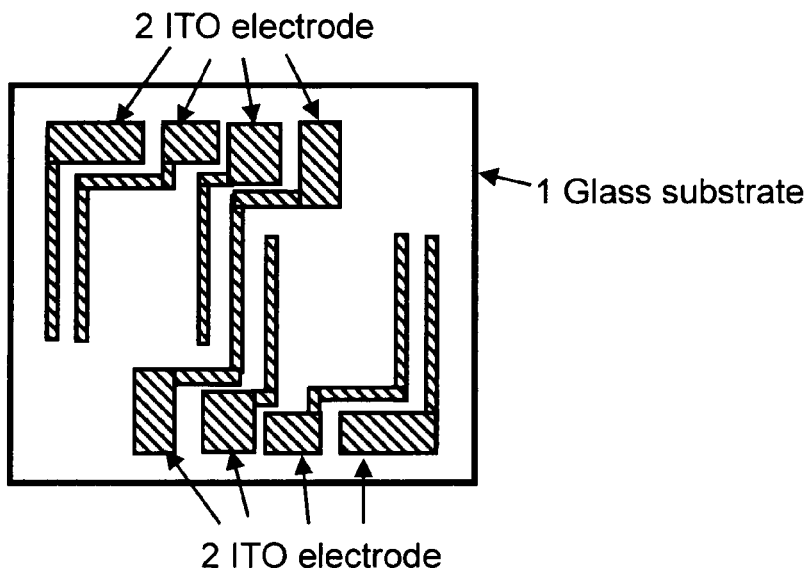
FIG. 1 is a view showing the upper surface of a glass substrate on which an indium tin oxide (ITO) electrode is formed.

The first π-conjugated polymer composition of the invention comprises: (a) a solvent; (b) a π-conjugated polymer which is dissolved in the solvent; (c) at least one of an acidic substance and a salt of an acidic substance; and (d) a phenolic compound.

The π-conjugated polymer is a π-conjugated polymer which is doped with a dopant. The details thereof will be mentioned later.

When only an acidic substance is contained as the component (c), the acidic substance is different from the phenolic compound, when only a salt of an acidic material is contained, the salt of an acidic substance is different from the phenolic compound, and when both the acidic substance and the salt of an acidic substance are contained, at least one of the acidic substance and the salt of an acidic substance is different from the phenolic compound.

The details of the acidic substance, the salt of an acidic substance and the phenolic compound will be mentioned later.

Meanwhile, the first π-conjugated polymer composition according to the invention can be obtained by mixing a solvent, a π-conjugated polymer which is dissolved in this solvent, at least one of an acidic substance and a salt of an acidic substance and a phenolic compound, for example.

The second π-conjugated polymer composition according to the invention is a π-conjugated polymer composition which is produced by using (a) a solvent, (b) a π-conjugated polymer which is dissolved in this solvent, (c) at least one of an acidic substance and a salt of an acidic substance and (d) a phenolic compound as starting materials.

When only an acidic substance is contained as the component (c), the acidic substance is different from the phenolic compound, when only the salt of an acidic substance is contained as the component (c), the salt of an acidic substance is different from the phenolic compound, and when both the acidic substance and the salt of an acidic substance are contained as the component as the component (c), at least one of the acidic substance and the salt of an acidic substance is different from the phenolic compound.

Details of an acidic substance, a salt of an acidic substance and a phenolic compound will be mentioned later.

The second π-conjugated polymer composition according to the invention can be obtained by mixing a solvent, a π-conjugated polymer which is dissolved in this solvent, at least one of an acidic substance and a salt of an acidic substance and a phenol compound, for example.

Meanwhile, conceptually, the composition of the invention includes both the first π-conjugated polymer composition and the second π-conjugated polymer composition of the invention.

As for the first π-conjugated polymer composition and/or the second π-conjugated polymer composition of the invention, it is preferred that, when it contains only the acidic substance as the component (c), the acidic substance be different from the dopant, when it contains only a salt of an acidic substance as the component (c), the salt of an acidic substance be different from the dopant, and when it contains both the acidic substance and the salt of an acidic substance as the component (c), it is preferred that at least one of the acidic substance and the salt of an acidic substance be different from the dopant.

As for the first π-conjugated polymer composition and/or the second π-conjugated polymer composition of the invention, the following is preferable: when it contain only the acidic substance as the component (c), the acidic substance has an acidity of 5.0 or less, when it contains only the salt of an acidic substance as the component (c), the acidic substance of the salt has an acidity of 5.0 or less, and when it contains both the acidic substance and the salt of an acidic substance as the component (c), at least one of a condition that the acidic substance has an acidity of 5.0 or less and a condition that the acidic substance of the salt has an acidity of 5.0 or less is satisfied.

As for the first π-conjugated polymer composition and/or the second π-conjugated polymer composition of the invention, it is preferred that the π-conjugated polymer comprise nitrogen atom, the dopant be a sulfonic acid;
when only the acidic substance is contained as the component (c), the acidic substance be a sulfonic acid which is the same as or different from the dopant;
when only the salt of an acidic substance be contained as the component (c), the salt of an acidic substance be a salt of a sulfonic acid which is the same as or different from the dopant; and when the acidic substance and the salt of an acidic substance are contained as the component (c), the acidic substance and the salt of an acidic substance be a sulfonic acid or a salt of a sulfonic acid which is the same as or different from the dopant;
and the following formula (1) be satisfied:

$$0.21 \le S_1/N_1 \le 1.2 \tag{1}$$

wherein $S_1$ is the mole number of sulfur atom contained in the composition and $N_1$ is the mole number of nitrogen atom contained in the composition.

As for the first π-conjugated polymer composition and/or the second π-conjugated polymer composition of the invention, it is preferred that the π-conjugated polymer comprise nitrogen atom; the dopant be a sulfonic acid; when only the acidic substance is contained as the component (c), the acidic substance be a sulfonic acid which is the same as or different from the dopant;
when only the salt of an acidic substance is contained as the component (c), the salt of an acidic substance is a salt of a sulfonic acid which is the same or different from the dopant; and when the acidic substance and the salt of an acidic substance are contained as the component (c), the acidic substance and the salt of an acidic substance be a sulfonic acid or a salt of a sulfonic acid which is the same as or different from the dopant.

Further, the formula (2) is satisfied when only the acidic substance is contained as the component (c); the formula (3) is satisfied when only the salt of an acidic substance is contained as the component (c); and the formula (4) is satisfied when the acidic substance and the salt of the acidic substance are contained as the component (C):

$$0.01 \le S_2/N_2 \le 0.5 \tag{2}$$

$$0.01 \le S_3/N_3 \le 0.5 \tag{3}$$

$$0.01 \le S_4/N_4 \le 0.5 \tag{4}$$

Here, $S_2$ is the total mole number of sulfur atom contained in all of acidic substance(s) contained in the composition, $N_2$ is the total mole number of nitrogen atom of π-conjugated polymer doped with all dopant(s) contained in the composition, $S_3$ is the total mole number of sulfur atom contained in all of salt(s) of acidic substance (s) contained in the composition, $N_3$ is the total mole number of nitrogen atom of π-conjugated polymer doped with all dopant(s) contained in the composition, $S_4$ is the total mole number of sulfur atom contained in all of acidic substance(s) and salt(s) of acidic substance(s) contained in the composition, and $N_4$ is the total mole number of nitrogen atom of all π-conjugated polymers doped with dopant(s) contained in the composition.

As for the first π-conjugated polymer composition and/or the second π-conjugated polymer composition of the invention, it is preferred that the π-conjugated polymer comprise nitrogen atom, the dopant be a sulfonic acid and the formula (5) be satisfied:

$$0.2 \le S_5/N_5 \le 0.7 \tag{5}$$

wherein $S_5$ is the total mole number of sulfur atoms of the π-conjugated polymer which is doped with the dopant contained in the composition and $N_5$ is the total mole number of nitrogen atom of the π-conjugated polymer which is doped with the dopant contained in the composition.

Meanwhile, the mole number of the nitrogen atom and the sulfur atom are the values measured by the organic elementary analysis.

It is preferred that the π-conjugated polymer have a weight-average molecular weight of 1,000 or more, more preferably 1,000 to 1,000,000.

Here, the π-conjugated polymer is a polymer having a π-conjugated main chain in which a double bond and a single bond are alternately arranged.

Specific examples of the π-conjugated polymer include substituted or unsubstituted polyaniline, polypyrrole, polythiophene, poly(p-phenylene), poly(p-phenylenevinylene) and derivatives thereof. In respect of versability and economy, the π-conjugated polymer is preferably substituted or unsubstituted polyaniline and/or a polyaniline derivative.

If the π-conjugated polymer is polyaniline, the weight-average molecular weight of polyaniline is preferably 20,000 or more, more preferably 1,000,000. If the weight-average molecular weight is less than 20,000, the strength or stretchability of a conductive product obtained from a composition may be lowered.

The molecular weight distribution is 1.5 to 10.0, for example. In respect of conductivity, it is preferred that a narrow molecular weight distribution is preferable. Further, in respect of solubility in a solvent and shaping properties, a wide molecular distribution is preferable.

The molecular weight and the molecular weight distribution as mentioned above can be measured by gel permeation chromatography (GPC).

The doped π-conjugated polymer of the invention is dissolved in a solvent. The "is dissolved" means a state that a π-conjugated polymer is homogeneously dissolved in a solvent in the state of a molecule. As a result, when the solvent is dried, a uniform coating film of a π-conjugated polymer having no clear grain boundary is obtained.

The doped π-conjugated polymer is doped with a dopant.

Here, the "π-conjugated polymer is doped with a dopant" means that a charge transfer body (carrier) which can be moved freely is injected in a π-conjugated polymer by a dopant.

The doping ratio a of the doped π-conjugated polymer is preferably $0<a<1$, more preferably 0.7 or less, further preferably $0.2<a<0.7$, with $0.4<a<0.7$ being most preferable.

The doping ratio is generally defined by (the number of moles of dopant molecules of a dopant which dopes a conductive polymer)/(monomer unit of a conductive molecules). If the doped π-conjugated polymer is a polyaniline composite, $0<a<1$ is preferable, more preferably $a≤0.7$, further preferably $0.2<a<0.7$, with $0.4<a<0.7$ being most preferable.

If the doping ratio is 0.2 or less, conductivity and solubility of a π-conjugated polymer in a solvent may be lowered. If the doping ratio is 0.7 or more, conductivity may be lowered.

The doping ratio a of the dopant is 0.5 means that two nitrogen atoms are doped with one molecule of a dopant.

It is preferred that the molded article of the doped π-conjugated polymer has a conductivity of 0.01 S/cm or more. Conductivity is measured by the four probe method.

Here, a molded article can be obtained as follows. "500 mg of a π-conjugated polymer which is doped with a dopant" is dissolved in 10 g of toluene, thereby to prepare a solution for measuring conductivity. On the upper surface of a glass substrate 1 on which an indium tin oxide (ITO) electrode 2 is formed by patterning, which is shown in FIG. 1, 1 ml of a solution for measuring conductivity is applied. Specifically, the solution is applied by spin coating. Application by spin coating is conducted in a nitrogen atmosphere. In the spin coating, the glass substrate rotation time after adding dropwise the solution for measuring conductivity to the glass substrate is 15 seconds. The glass substrate rotation speed is 500 rpm. Thereafter, the glass substrate is dried to form a π-conjugated polymer thin film. Here, drying is conducted in a nitrogen atmosphere, and conducted for 5 minutes at 80° C.

Here, the molded article is a molded article of the π-conjugated polymer formed on the glass substrate. Conductivity can be obtained as follows, for example.

Figure 2:
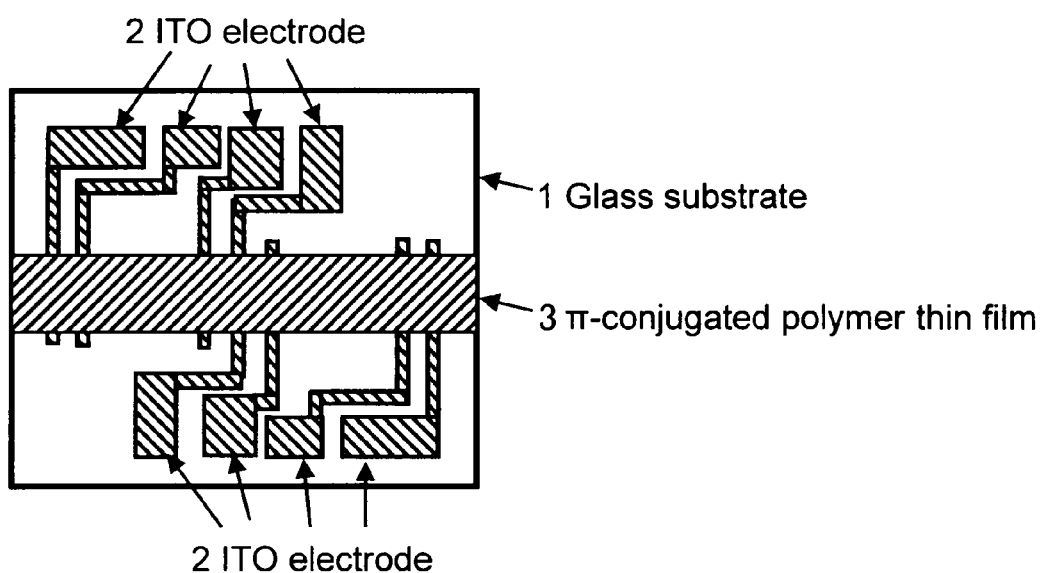
FIG. 2 is a view showing the upper surface of a glass substrate in which the terminal of the ITO electrode is exposed by cutting off the surface of the π-conjugated polymer thin film.

After drying the π-conjugated polymer thin film, as shown in FIG. 2, the part of a π-conjugated polymer thin film 3 covering terminals of the ITO electrode is scraped off in a nitrogen atmosphere, thereby to allow the terminals of the ITO electrode to be exposed to the surface. By using the exposed terminals of the ITO electrode, conductivity is measured by a four probe method by using a resistance meter manufactured by Mitsubishi Chemical Corporation.

It is preferred that the conductivity of a molded article of the π-conjugated polymer composition be 0.01 s/cm or more. Conductivity is measured by the four probe method.

Here, the molded article can be obtained by the following method. On the upper surface of a glass substrate 1 on which an indium tin oxide (ITO) electrode 2 is formed thereon by patterning, which is shown in FIG. 1, 1 ml of a π-conjugated polymer composition is applied. Specifically, the solution is applied by spin coating. Application by spin coating is conducted in a nitrogen atmosphere. In the spin coating, the glass substrate rotation time after dropwise addition of the π-conjugated polymer composition to the glass substrate is 15 seconds. The glass substrate rotation speed is 500 rpm. Thereafter, the glass substrate is dried to form a π-conjugated polymer composition thin film. Here, drying is conducted in a nitrogen atmosphere, and conducted for 5 minutes at 80° C.

Figure 3:
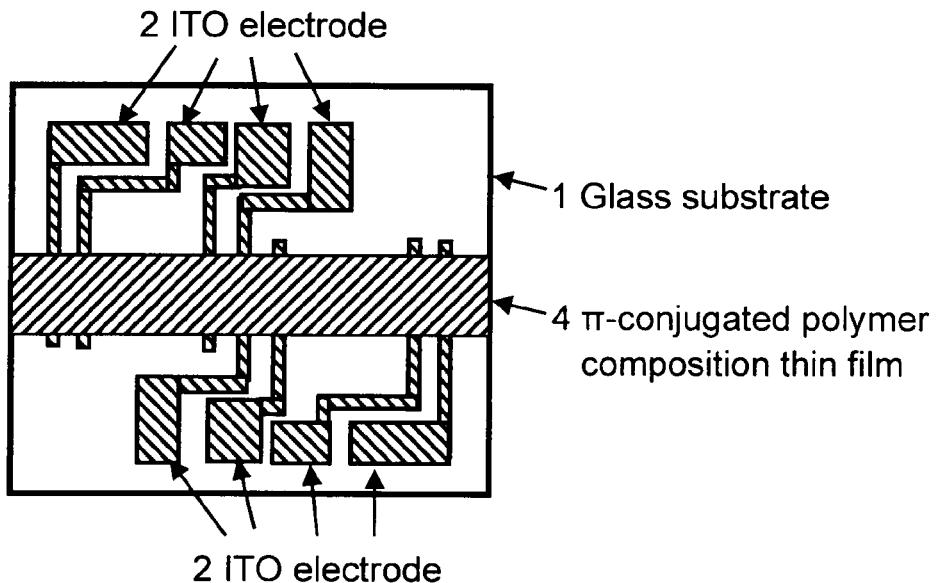
FIG. 3 is a view showing the upper surface of a glass substrate in which the terminal of the ITO electrode is exposed by cutting off the π-conjugated polymer composition thin film.

Here, the molded article is a molded article of the π-conjugated polymer composition formed on the glass substrate. Conductivity can be obtained as follows, for example. After drying the π-conjugated polymer composition thin film, as shown in FIG. 3, the part of a π-conjugated polymer composition thin film 4 covering terminals of the ITO electrode is scraped off in a nitrogen atmosphere, thereby to allow the terminals of the ITO electrode to be exposed to the surface. By using the exposed terminals of the ITO electrode, conductivity is measured by a four probe method by using a resistance meter manufactured by Mitsubishi Chemical Corporation.

The π-conjugated polymer which is doped with a dopant is preferably a substituted or unsubstituted polyaniline which is protonated.

As examples of the dopant, an organic protonic acid or its salts can be given.

As examples of the substituent of the substituted polyaniline, a straight-chain or branched hydrocarbon group such as a methyl group, an ethyl group, a hexyl group and an octyl group; an alkoxy group such as a methoxy group and a phenoxy group; an aryloxy group; and a halogen-containing hydrocarbon group such as a $CF_3$ group can be given.

The substituted or unsubstituted polyaniline which is protonated as mentioned above is preferably a substituted or unsubstituted polyaniline which is protonated by an organic protonic acid represented by the following formula (I) or its salts.

$$M(XAR_n)_m \qquad (I)$$

In the above formula (I), M is a hydrogen atom, an organic free radical or an inorganic free radical.

As the organic free radical, a pyridinium group, an imidazolium group and an anilinium group can be given. As the inorganic free radical group, sodium, lithium, potassium, cesium, ammonium or the like can be given.

X is an acidic group, and examples thereof include groups represented by $-SO_3^-$, $-PO_3^{2-}$, $-PO_4(OH)^-$, $-OPO_3^{2-}$, $-OPO_2(OH)-$ and $-COO^-$. A group represented by $-SO_3^-$ is preferable.

A is a hydrocarbon group which may include a substituent.

Examples of the hydrocarbon group include a straight-chain or branched alkyl group having 1 to 24 carbon atoms; an alkenyl group; a cycloalkyl group which may have a substituent such as cyclopentyl, cyclohexyl, cycloheptyl, cyclooctyl and mentyl; a dicycloalkyl group or a polycycloalkyl group which may be fused such as bicyclohexyl, norbonyl and adamantyl; an aryl group containing an aromatic ring which may have a substituent such as phenyl, tosyl, thiophenyl, pyrrolinyl, pyridinyl and furanyl; a diaryl group or a polyaryl group which may be fused such as naphthyl, anthracenyl, fluorenyl, 1,2,3,4-tetrahydronaphthyl, indanyl, quinolinyl and indolinyl; and an alkylaryl group. Corresponding (n+1) valent groups can be given.

R is independently a substituent represented by $-R^1$, $-OR^1$, $-COR^1$, $-COOR^1$, $-CO(COR^1)$ or $-CO(COOR^1)$.

Here, $R^1$ is a hydrocarbon group which may contain a substituent having 4 or more carbon atoms, a silyl group, an alkylsilyl group, a group shown by $-(R^2O)_x-R^3$, or a group represented by $-(OSiR^3_2)_x-OR^3$ (wherein $R^2$ is an alkylene group, $R^3$s are a hydrocarbon group which is the same or different, and x is an integer of 1 or more).

Examples of the hydrocarbon group shown by $R^1$ include a straight-chain or branched butyl group, a straight-chain or branched pentyl group, a straight-chain or branched hexyl group, a straight-chain or branched heptyl group, a straight-chain or branched octyl group, a straight-chain or branched nonyl group, a straight-chain or branched decyl group, a straight-chain or branched dodecyl group, a straight-chain or branched pentadecyl group and a straight-chain or branched eicosanyl group.

n is an integer of 2 or more. m is a valence of M.

An organic protonic acid represented by the formula (I) and its salts are preferably dialkylbenzenesulfonic acid, dialkylnaphthalenesulfonic acid, a sulfophphthalic acid ester, or an organic protonic acid represented by the following formula (II) or its salts.

$$M(XCR^4(CR^5_2COOR^6)COOR^7)_p \quad (II)$$

In the formula (II), M and X are the same as those in the formula (I). p is the valency of M.

$R^4$ and $R^5$ are independently a hydrogen atom, a hydrocarbon group or a group shown by $R^8_3Si-$ (wherein $R^8$ is a hydrocarbon group, and three $R^8$s are the same or different).

As the hydrocarbon group represented by $R^4$ and $R^5$, a straight-chain or branched alkyl group having 1 to 24 carbon atoms; an aryl group having an aromatic ring; an alkylaryl group or the like can be given.

Examples of the hydrocarbon group represented by $R^8$ are the same as those of the hydrocarbon group represented by $R^4$ and $R^5$.

$R^6$ and $R^7$ are independently a hydrocarbon group or a group represented by $-(R^9O)_q-R^{10}$ (wherein $R^9$ is a hydrocarbon group or a silylene group, $R^{10}$ is a hydrogen atom, a hydrocarbon group or a group represented by $R^{11}_3Si-$ ($R^{11}$ is a hydrocarbon group and three $R^{11}$s are the same or different) and q is an integer of 1 or more.

As the hydrocarbon group represented by $R^6$ and $R^7$, a straight-chain or branched alkyl group having 1 to 24, preferably 4 or more, carbon atoms; an aryl group having an aromatic ring; an alkylaryl group or the like.

Specific examples of the hydrocarbon group represented by $R^6$ and $R^7$ include a straight-chain or branched butyl group, a straight-chain or branched pentyl group, a straight-chain or branched hexyl group, a straight-chain or branched octyl group, a straight-chain and branched decyl group and the like.

As the hydrocarbon group represented by $R^9$, a straight-chain or branched alkyl group having 1 to 24 carbon atoms; an arylene group containing an aromatic ring; an alkylarylene group; an arylalkylene group or the like can be mentioned.

Examples of the hydrocarbon group represented by $R^{10}$ and $R^{11}$ are the same as those for $R^4$ and $R^5$. q is preferably an integer of 1 to 10.

Specific examples of an organic protonic acid represented by the formula (II) and its salts when $R^6$ and $R^7$ are a group represented by $-(R^9O)_n-R^{10}$ include acids represented by the following formula:

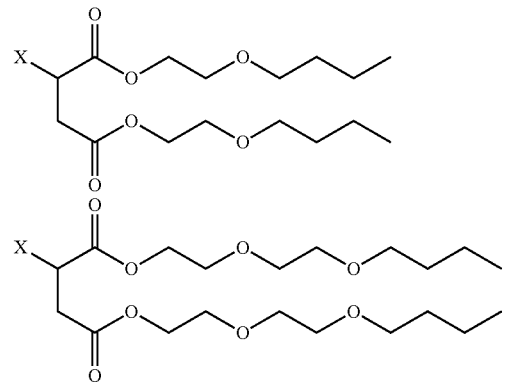

wherein X is a group represented by $-SO_3$ or the like.

The compound (an organic protonic acid (II) or its salts) represented by the formula (II) is preferably a sulfosuccinic acid derivative represented by the following formula (III) (hereinafter often referred to as the "sulfosuccinic acid derivative (III)"):

$$M(O_3SCH(CH_2COOH^{12})COOR^{13})_m \quad (III)$$

In the formula (III), M and m are the same as those in the above formula (I).

$R^{12}$ and $R^{13}$ are independently a hydrocarbon group or $-(R^{14}O)_r-R^{15}$ (wherein $R^{14}$ is a hydrocarbon group or a silylene group, $R^{15}$ is a hydrogen atom, a hydrocarbon group or a group represented by $R^{16}_3Si-$ (wherein $R^{16}$ is a hydrocarbon group and three $R^{16}$s may be the same or different), and r is an integer of 1 or more.

The hydrocarbon group represented by $R^{12}$ and $R^{13}$ are the same as those represented by $R^6$ and $R^7$.

The hydrocarbon group represented by $R^{14}$ is the same as that represented by $R^9$. The hydrocarbon group represented by $R^{15}$ and $R^{16}$ are the same as those represented by $R^4$ and $R^5$.

r is preferably an integer of 1 to 10.

Specific examples of the organic protonic acid represented by the formula (III) or its salts when $R^{12}$ and $R^{13}$ are groups represented by $-(R^{14}O)_r-R^{15}$ are the same as those of the organic protonic acid represented by the formula (II) or its salts when $R^6$ and $R^7$ are groups represented by $-(R^9O)_n-R^{10}$.

The hydrocarbon group represented by $R^{12}$ and $R^{13}$ are the same as those represented by the hydrocarbon group represented by $R^6$ and $R^7$, and a butyl group, a hexyl group, a 2-ethylhexyl group, a decyl group or the like are preferable.

The acidic substance may be any of an organic acid, which is an acid of an organic compound, and an inorganic acid, which is an acid of an inorganic compound. Preferably, the acidic substance is an organic acid.

As the acidic substance which is included in the composition of the invention, an organic acid containing one or more acidic groups such as a sulfonic acid group, a phosphoric acid group, a phosphonic acid group, a carboxy group can be preferably given.

The organic acid having the above-mentioned sulfonic aid group is preferably a cyclic, chain or branched alkylsulfonic acid, a substituted or unsubstituted aromatic sulfonic acid or polysulfonic acid, which has one or more sulfonic acid groups.

As the alkylsulfonic acid, methanesulfonic acid, ethanesulfonic acid and di-2-ethylhexylsulfosuccinic acid can be given, for example.

As the aromatic sulfonic acid, a sulfonic acid having a benzene ring, a sulfonic acid having a naphthalene skeleton and a sulfonic acid having an anthracene skeleton can be given, for example. Further, as the above-mentioned aromatic sulfonic acid, a substituted or unsubstituted benzenesulfonic acid, naphthalenesulfonic acid and anthracenesulfonic acid can be given. The substituent is a substituent selected from the group consisting of an alkyl group, an alkoxy group, a hydroxyl group, a nitro group, a carboxy group and an acyl group, for example. The aromatic sulfonic acid may be substituted by one or more substituents. For example, naphthalenesulfonic acid, dodecylbenzenesulfonic acid and anthraquinonesulfonic acid can be given. As the aromatic sulfonic acid, substituted or unsubstituted naphthalenesulfonic acid is preferable.

The above-mentioned polysulfonic acid is sulfonic acid in which a plurality of sulfonic acid residues is substituted on the high-molecular chain or the side chain. Polystyrene sulfonic acid can be given, for example.

Here, the alkyl group is preferably a straight-chain or branched alkyl group having 1 to 18 carbon atoms.

The above-mentioned organic acid having a carboxy group is preferably a cyclic, chain or branched alkylcarboxylic acid or a substituted or unsubstituted aromatic carboxylic acid which has one or more carboxy groups.

As for the alkylcarboxylic acid, undecylenic acid, cyclohexanecarboxylic acid, 2-ethylhexanoic acid or the like can be given.

As for the aromatic carboxylic acid, a substituted or unsubstituted benzenecarboxylic acid, naphthalenecarboxylic acid or the like can be given. Here, the substituent is a substituent selected from the group consisting of a sulfonic acid group, an alkyl group, an alkoxy group, a hydroxyl group, a nitro group and an acyl group. The aromatic carboxylic acid may be substituted by one or more substituents. For example, salicylic acid, benzoic acid, naphthoic acid, trimellitic acid or the like can be given.

Here, the alkyl group is preferably a straight-chain or branched alkyl group having 1 to 18 carbon atoms.

The organic acid having a phosphoric acid group or a phosphonic acid group as mentioned above is preferably a cyclic, chain or branched alkylphosphoric acid or phosphonic acid or a substituted or unsubstituted aromatic phosphoric acid or phosphonic acid which has one or more phosphoric acid groups or phosphonic groups.

As the alkylphosphoric acid or phosphonic acid as mentioned above, dodecylphosphoric acid, bis(2-ethylhexyl) phosphate or the like can be given, for example.

As the aromatic phosphoric acid or phosphonic acid as mentioned above, a substituted or unsubstituted benzenesulfonic acid or phosphonic acid and naphthalene sulfonic acid or phosphonic acid or the like can be given, for example. Here, the substituent is a substituent selected from the group consisting of an alkyl group, an alkoxy group, a hydroxyl group, a nitro group, a carboxy group and an acyl group. One or more groups may be substituted. For example, phenylphosphonic acid or the like can be given.

Here, the alkyl group is preferably a straight-chain or branched alkyl group having 1 to 18 carbon atoms.

As the salt of an acidic substance contained in the composition of the invention, salts of the acidic substance mentioned above can be given.

The composition of the invention may contain one or more of the above-mentioned acidic substance or its salts. Further, the composition of the invention may contain a plurality of different acidic substances. Further, the composition of the invention may contain a plurality of different acidic substances. The composition of the invention may contain a plurality of different acidic substances or salts of acidic substance.

It is preferred that the acidic substance have an acidity (pKa) of 5.0 or less. Although the lower limit of the acidity (pKa) is not particularly restricted, if the acidic substance having an acidity of −4.0 or less is added, deterioration of the π-conjugated polymer may occur.

The acidity (pKa) is measured by the computational chemistry method. That is, the acidity is measured by a method stated in the Journal of Physical Chemistry (1995, Vol. 99, page 2224), in which the charge density of the molecular surface is calculated by quantum chemical calculation developed by A. Klamat et al., and interaction between different molecules is calculated.

Specifically, by using the "TURBOMOLE Version 6.1" (manufactured by COSMO logic, LLC), the structure is optimized by using TZVP as the basic function, and the COSMO-RS calculation method is conducted by using the "COSMO therm Version C2.1 Release 01.10" (manufactured by COSMO logic, LLC).

Here, the pKa is calculated by inputting the conditions in a water solvent at 25° C., the chemical formula of a molecule and the chemical formula of de-protonated molecule in the "COSMO therm Version C2.1 Release 01.10".

In the composition of the invention, the content of at least one of the acidic substance and the salt of an acidic substance is preferably 1 to 1000 parts by mass, more preferably 10 to 100 parts by mass, relative to 100 parts by mass of the doped π-conjugated polymer.

The solvent contained in the composition of the invention is preferably an organic solvent.

The solvent may be an organic solvent which is essentially not miscible with water (water-immiscible organic solvent) or be a water-soluble organic solvent.

As the water-immiscible organic solvent, hydrocarbon solvents such as benzene, toluene, xylene, ethylbenzene and tetraline; a halogen-containing solvent such as methylene chloride, chloroform, carbon tetrachloride, dichloroethane and tetrachloroethane; ester-based solvent such as ethyl acetate can be mentioned. Of these, toluene, xylene, chloroform, trichloroethane and ethyl acetate are preferable since they are improved in capability of dissolving doped polyaniline.

As the water-soluble organic solvent, alcohols; ketones such as acetone and methyl ethyl ketone; polar ethers such as tetrahydrofuran and dioxane; and non-protonic polar solvents such as N-methylpyrrolidone can be mentioned.

The doped polyaniline and the phenolic compound which will be mentioned later, both of which may be included in the composition of the invention, are dissolved in an alcohol such as 2-butanol, 2-pentanol and benzyl alcohol. Unlike toluene or the like, alcohol is preferable in respect of reducing environmental load.

When an organic solvent is used, use of a mixed organic solvent of a water-immiscible organic solvent and a water-soluble organic solvent in a mass ratio of 99 to 50:1 to 50 is preferable in respect of a long-term storage since generation of a gel or the like is prevented when the composition of the invention is stored.

As the water-immiscible organic solvent of the mixed organic solvent, a non-polar organic solvent can be used. For example, toluene or chloroform is preferable. Further, as the water-soluble organic solvent of the mixed organic solvent, a high-polar organic solvent can be used. For example, methanol, ethanol, isopropyl alcohol, 2-methoxy ethanol, 2-ethoxy ethanol, acetone, methyl ethyl ketone, methyl isobutyl ketone, tetrahydrofuran or diethyl ether is preferable.

The ratio of the doped π-conjugated polymer in the organic solvent is, although it depends on the type of an organic solvent, normally 900 g/L or less, preferably 0.01 to 300 g/L. If the content of the doped π-conjugated polymer is too large, the solution state cannot be maintained, handling of the solution when forming a molded article is difficult, homogeneity of a molded article is deteriorated, and consequently, the electric properties, mechanical strength and transparency of a molded article are lowered. On the other hand, if the content of the doped π-conjugated polymer is too small, only a significantly thin film can be produced by the method hereinafter explained, whereby production of a homogeneous conductive film is difficult.

The composition of the invention further comprises a phenolic compound. The phenolic compound is different from the acidic substance or the salt of an acidic substance as mentioned above.

No specific restrictions are imposed on the phenolic compound contained in the composition of the invention, and it is a compound represented by ArOH (wherein Ar is an aryl group or a substituted aryl group). Specific examples thereof include phenol; substituted phenols such as o-, m- or p-cresol, o-, m- or p-ethylphenol, o-, m- or p-propylphenol, o-, m- or p-butylphenol, o-, m- or p-chlorophenol, salicylic acid, hydroxybenzoic acid and hydroxynaphthalene; a polyvalent phenolic alcohols such as catechol and resorcinol; and polymeric compounds such as a phenolic resin, polyphenol and poly(hydroxystyrene) can be exemplified.

The molar concentration of the phenolic compound relative to 1 g of doped π-conjugated polymer is preferably in the range of 1 mmol/g to 50 mmol/g. If the amount of the phenolic compound is too small, the effects of improving electric conductivity may not be obtained. Further, if the amount of the phenolic compound is too large, the homogeneity of the composition may be impaired or large amount of labor such as heat or time may be required for distilling the phenolic compound off, as a result, a material having deteriorated transparency or electric properties may be obtained. In particular, the molar concentration is preferably in the range of 2 mmol/g to 20 mmol/g.

The composition of the invention comprising a phenolic compound is preferably a phenolic compound represented by the following formula (1). It is further preferred that the weight ratio of a phenolic compound represented by the formula (1) and the doped π-conjugated polymer (phenolic compound/π-conjugated polymer) be 0.01 to 10.0.

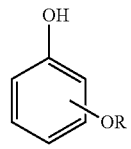

(1)

wherein R is an alkyl group having 1 to 20 carbon atoms, an alkenyl group having 1 to 20 carbon atoms, a cycloalkyl group having 1 to 20 carbon atoms, an alkylthio group having 1 to 20 carbon atoms, an aryl group having 1 to 20 carbon atoms, an alkylaryl group having 1 to 20 carbon atoms or an arylalkyl group having 1 to 20 carbon atoms.

In the phenolic compound represented by the formula (1), the substitution position of —OR is preferably the meta- or para-position of the phenolic hydroxyl group. By allowing the substitution position of —OR to be the meta- or para-position, the steric hindrance of the phenolic hydroxyl group is decreased, whereby the conductivity of the composition can be further increased.

Instead of the phenolic compound represented by the formula (1) above, it is possible to use the phenolic compound represented by the following formula (2).

The phenolic compound included in the composition of the invention is preferably the phenolic compound represented by the following formula (2). It is further preferred that the weight ratio of the phenolic compound represented by the following formula (2) and the doped π-conjugated polymer (phenolic compound/π-conjugated polymer) be 0.01 to 5.0.

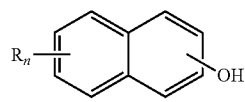

(2)

wherein n is an integer of 0 to 6; R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms, an aryl group having 6 to 20 carbon atoms, an alkylaryl group having 6 to 20 carbon atoms or an arylalkyl group having 6 to 20 carbon atoms.

Further, instead of the phenolic compound represented by the formula (1), the phenolic compound represented by the formula (3) can be used.

The phenolic compound included in the composition of the invention is preferably the phenolic compound represented by the following formula (3). It is further preferred that the weight ratio of the phenolic compound represented by the formula (3) and the doped π-conjugated polymer (phenolic compound/π-conjugated polymer) be 0.01 to 10.0.

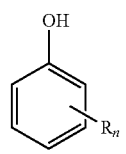

(3)

wherein n is an integer of 1 to 5 and R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms, an aryl group having 6 to 20 carbon atoms, an alkylaryl group having 6 to 20 carbon atoms or an arylalkyl group having 6 to 20 carbon atoms.

As for R in the above-mentioned formulas (1), (2) and (3), as the alkyl group, a methyl group, an ethyl group, a propyl group, an isopropyl group, a butyl group, an isobutyl group and a tert-butyl group can be given.

As the alkenyl group, a substituent having an unsaturated bond in the molecule of the alkyl group can be given.

As the cycloalkyl group, cyclopentane, cyclohexane or the like can be given.

As the alkylthio group, a methylthio group, an ethylthio group or the like can be given.

As the aryl group, phenyl, naphthyl or the like can be given.

As the alkylaryl group and the arylalkyl group, a substituent obtained by combining the alkyl group and the aryl group as mentioned above can be given.

Of these groups, a methyl group or an ethyl group is preferable as R.

The composition of the invention comprises 15 weight % or more, 50 weight % or more, 70 weight % or more and 100 weight % of a π-conjugated polymer, an acidic substance and/or a salt of an acidic substance, a solvent and a phenolic compound.

In addition to these essential components, the composition of the invention may contain other resins, inorganic materials, hardening agents, plasticizers or the like in an amount range which does not impair the advantageous effects of the invention.

Other resins are added as a binder base, a plasticizer, a matrix base or the like. Specific examples thereof include polyolefins such as polyethylene and polypropylene, chlorinated polyolefin, polystyrene, polyester, polyamide, polyacetal, polyethylene terephthalate, polycarbonate, polyethylene glycol, polyethylene oxide, polyacrylic acid, polyacrylic ester, polymethacrylic ester and polyvinyl alcohol.

Instead of the resin, or together with the resin, a precursor capable of forming a thermosetting resin such as an epoxy resin, a urethane resin and a phenol resin may be used.

An inorganic material is added in order to improve mechanical properties such as strength, surface hardness and dimensional stability, for example. Specific examples include silica (silicon dioxide), titania (titanium oxide) and alumina (aluminum oxide).

A hardening agent is added in order to improve mechanical properties such as strength, surface hardness and dimensional stability, for example. Specific examples thereof include a thermosetting agent such as phenolic resin and the like and a photocurable agent composed of an acrylate monomer and a photopolymerizable agent.

A plasticizer is added in order to improve mechanical properties such as tensile strength and flexural strength, for example. Specific examples thereof include a phthalate ester and a phosphate ester.

The composition of the invention can be prepared by a known method. For example, it can be prepared by a method disclosed in WO05/052058.

A conductive molded article can be obtained from the composition of the invention.

For example, a composition obtained by adding a small amount of a compound having a phenolic hydroxyl group to a complex of polyaniline and protonic acid dissolved in an organic solvent is applied to glass or the like, whereby a film, which is a molded article of conductive polyaniline, can be obtained. Here, before the application, by further adding an acidic substance or its salts, a molded article of conductive polyaniline composition obtained after application can be a conductive product improved in heat resistance.

EXAMPLES

Production Example 1

Production of Protonated Polyaniline

A solution prepared by dissolving with stirring 144 g of aerosol OT (di-2-ethylhexyl sulfosuccinate sodium salt, purity: 75% or more, manufactured by Wako pure chemical industries, Ltd.) in 4 L of toluene was placed in a 30 L glass reactor (provided with a mechanical agitator, jacket, thermometer and dropping funnel) under a stream of nitrogen. Then, 150 g of aniline as a raw material was added to and dissolved in the solution while stirring. Cooling with stirring of the flask with a cooling medium was started, and 12 L of 1N hydrochloric acid was added to the solution. Next, with the solution being cooled to −3° C., a solution obtained by dissolving 214 g of ammonium persulfate in 4 L of 1N hydrochloric acid was dropped with the dropping funnel. The operation was completed in 3 hours and 10 minutes. For 18 hours and 30 minutes after the start of dropping, the solution was stirred with the internal temperature of the solution kept at 0° C.±1° C. Then, 8 L of toluene was added thereto, the temperature of the solution was increased to 19° C. and the solution was left to stand. The solution was then separated into two phases by being left to stand, and of the two phases, an aqueous phase (lower phase) was extracted from the bottom of the reactor, whereby a toluene solution of a crude polyaniline composite was obtained.

After adding 4 L of ion-exchange water to the composite solution obtained and stirring, the resultant solution was left to stand, thereby separating an aqueous phase. After conducting this operation again, the composite solution was cleaned with 4 L of 1N hydrochloric acid in the same manner as mentioned above. After being left to stand, the acid solution was separated to recover the toluene solution of the polyaniline composite. A slight amount of insoluble matters contained in this composite solution were removed with a #5c filter paper, whereby the toluene solution of polyaniline composite soluble in toluene was recovered. This solution was transferred to an evaporator, heated in hot water of 60° C. and depressurized, whereby a volatile portion was distilled off to obtain 208 g of polyaniline composite (protonated polyaniline).

The elemental analysis of the polyaniline composite obtained when its volatile portion is substantially removed was shown below. From the ratio of the nitrogen weight % based on aniline as a raw material to the sulfur weight % based on sulfosuccinate, the mole fraction of aniline monomer unit/sulfosuccinate in the composite was found to be 0.62.

Carbon: 61.7 weight %, hydrogen: 8.2 weight %, nitrogen: 3.9 weight %, sulfur: 5.5 weight %

Measurement by GPC showed that the weight-average molecular weight of the polyaniline skeleton in the polyaniline composite was 150,000 g/mol.

Production Example 2

Production of Protonated di(2-ethylhexyl)sulfosuccinate 4 g of sodium di(2-ethylhexyl)sulfosuccinate (manufactured by TOKYO CHEMICAL INDUSTRY CO., LTD.) was stirred and dissolved in 100 ml of ethyl acetate. To the completely-dissolved solution, 50 ml of 1N hydrochloric acid was added, followed by stirring for 30 minutes. After stirring, the reaction solution was transferred to a separating funnel, and an organic phase was taken out, thereby to obtain a solution of di(2-ethylhexyl)sulfosuccinate. The solution obtained was evaporated to remove the solvent, thereby to obtain di(2-ethylhexyl)sulfosuccinic acid.

Production Example 3

Production of Aniline Salt of di(2-ethylhexyl)sulfosuccinic acid 0.22 g (2.4 mmol) of aniline was added to 1 g (2.4 mmol) of di(2-ethylhexyl)sulfosuccinic acid which was prepared in Production Example 2, followed by stirring for 10 minutes, whereby aniline salts of di(2-ethylhexyl)sulfosuccinic acid was obtained.

Production Example 4

Production of Protonated Monoisopropyl Naphthalenesulfonic Acid

Protonated monoisopropyl naphthalenesulfonic acid was prepared in the same manner as in Production Example 2, except that monoisopropyl naphthalenesulfonic acid Na (manufactured by TAKEMOTO OIL & FAT CO., LTD.) was instead of sodium di(2-ethylhexyl)sulfosuccinate.

Production Example 5

Production of Protonated Diisopropyl Naphthalenesulfonic Acid

Protonated diisopropyl naphthalenesulfonic acid was prepared in the same manner as in Production example 2, except that diisopropyl naphthalenesulfonic acid Na (manufactured by TAKEMOTO OIL & FAT CO., LTD.) was instead of sodium di(2-ethylhexyl)sulfosuccinate.

Production Example 6

Production Of Protonated Triisopropyl Naphthalenesulfonic Acid

Protonated triisopropyl naphthalenesulfonic acid was prepared in the same manner as in Production example 2, except that triisopropyl naphthalenesulfonic acid Na (manufactured by TAKEMOTO OIL & FAT CO., LTD.) was instead of sodium di(2-ethylhexyl)sulfosuccinate.

Example 1

Preparation of Conductive Polyaniline Composition 500 mg of the conductive polyaniline composite obtained in Production Example 1 was dissolved in 10 g of toluene again to prepare a homogeneous solution of the conductive polyaniline composite. To this solution, 0.01 g (0.024 mmol) of di(2-ethylhexyl)sulfosuccinic acid and 1 g (9.2 mmol) of m-cresol were added to obtain a homogeneous conductive polyaniline composition.

Here, the acidity (pKa) of di(2-ethylhexyl)sulfosuccic acid was −2.5 according to the following method. The method comprises; optimizing the structure using "TURBOMOLE Version 6.1" (manufactured by COSMO logic, LLC) (TZVP as the basis function), and conducting COSMO-RS calculation using the resulting structure by means of "COSMO therm Version C2.1 Release 01.10" (manufactured by COSMO logic LLC).

Here, conductions in a water solvent at 25° C., the chemical formula of a molecule and the chemical formula of a deprotonated molecule were inputted to determine pKa.

[Production of Conductive Polyaniline Thin Film]

Figure 4:
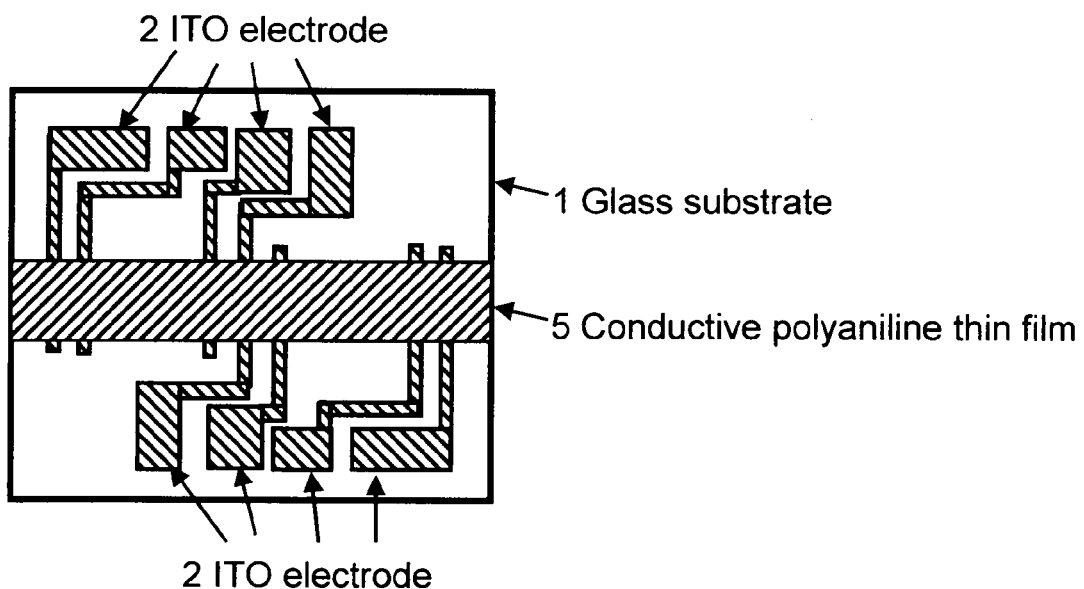
FIG. 4 is a view showing the upper surface of a glass substrate in which the terminal of the ITO electrode is exposed by cutting off the conductive polyaniline thin film.

About 1 ml of the conductive polyaniline composition obtained was applied on the upper surface of a glass substrate 1 on which an ITO electrode 2 (shown in FIG. 1) was formed by patterning, specifically spin coating. The application by spin coating was conducted in a nitrogen atmosphere. In the spin coating, a rotation time of the glass substrate after dropping of the conductive polyaniline composition onto the glass substrate was 15 seconds. The rotation rate of the glass substrate in the spin coating was set to 500 rpm. After that, the glass substrate was dried to form a conductive polyaniline thin film. Here, the drying was conducted in a nitrogen atmosphere. The drying time and temperature were set to 5 minutes and 80° C., respectively. As shown in FIG. 4, after drying the conductive polyaniline thin film, parts of the conductive polyaniline thin film 5 which cover a terminal of ITO electrode were scraped off in a nitrogen atmosphere to expose the terminal of ITO electrode to the surface. Using the terminal of ITO electrode exposed to the surface, the resistance of the thin film was measured by means of Loresta GP (manufactured by Mitsubishi Chemical Corporation, a resistivity meter using a four prove method), and the resistance value shortly after film formation was set to $R_0$ as an initial value.

[Heat Test at 105° C. of Conductive Polyaniline Thin Film]

The conductive polyaniline composition thin film obtained was left in the form of a glass substrate in a nitrogen atmosphere at a temperature of 105° C. for a predetermined time. After the lapse of a predetermined period of time, the temperature of the thin film was returned to room temperature, and then the resistance was measured in the same manner as in the measurement of the initial value $R_0$. The ratio $R/R_0$ of the resistance value R after the lapse of a predetermined period of time to the initial value $R_0$ was calculated to evaluate the time degradation (percentage of rise in resistance) of the thin film. The results are shown in Tables 1 and 2.

Here, the values in the Tables indicate the ratio $R/R_0$ of the resistance value R after the predetermined time to the initial value $R_0$.

Example 2

A homogeneous conductive polyaniline composition was prepared in the same manner as in Example 1, except that the amount of di(2-ethylhexyl)sulfosuccinic acid was changed to 0.05 g (0.12 mmol).

Using the conductive polyaniline composition obtained, a thin film was formed in the same manner as in Example 1, and the thin film obtained was evaluated. The results are shown in Tables 1 and 2.

Example 3

A homogeneous conductive polyaniline composition was prepared in the same manner as in Example 1, except that the amount of di(2-ethylhexyl)sulfosuccinic acid was changed to 0.2 g (0.47 mmol).

Using the conductive polyaniline composition obtained, a thin film was formed in the same manner as in Example 1 and the thin film obtained was evaluated. The results are shown in Tables 1 and 2.

Example 4

A homogeneous conductive polyaniline composition was prepared in the same manner as in Example 1, except that the additive amount of di(2-ethylhexyl)sulfosuccinic acid was changed to 0.5 g (1.18 mmol).

Using the conductive polyaniline composition obtained, a thin film was formed in the same manner as in Example 1 and the thin film obtained was evaluated. The results are shown in Tables 1 and 2.

Example 5

A homogeneous conductive polyaniline composition was prepared in the same manner as in Example 1, except that 0.01 g (0.02 mmol) of the aniline salt of di(2-ethylhexyl)sulfosuccinic acid obtained in Production example 3 was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Example 6

A homogeneous conductive polyaniline composition was prepared in the same manner as in Example 1, except that 0.05 g (0.10 mmol) of the aniline salt of di(2-ethylhexyl)sulfosuccinic acid obtained in Production Example 3 was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Example 7

A homogeneous conductive polyaniline composition was prepared in the same manner as in Example 1, except that 0.1 g (0.20 mmol) of the aniline salt of di(2-ethylhexyl)sulfosuccinic acid obtained in Production Example 3 was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Example 8

A homogeneous conductive polyaniline composition was prepared in the same manner as in Example 1, except that 0.2 g (0.39 mmol) of the aniline salt of di(2-ethylhexyl)sulfosuccinic acid obtained in Production Example 3 was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Example 9

A homogeneous conductive polyaniline composition was prepared in the same manner as in Example 1, except that 0.5 g (0.98 mmol) of the aniline salts of di(2-ethylhexyl)sulfosuccinic acid obtained in Production Example 3 were added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Example 10

A homogeneous conductive polyaniline composition was prepared in the same manner as in Example 1, except that 0.1 g (0.23 mmol) of sodium di(2-ethylhexyl)sulfosuccinate (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Example 11

A homogeneous conductive polyaniline composition was prepared in the same manner as in Example 1, except that 0.2 g (0.45 mmol) of sodium di(2-ethylhexyl)sulfosuccinate (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Example 12

A homogeneous conductive polyaniline composition was prepared in the same manner as in Example 1, except that 0.3 g (0.68 mmol) of sodium di(2-ethylhexyl)sulfosuccinate (manufactured by TOKYO CHEMICAL INDUSTRY CO., LTD.) was added instead of di(2-ethylhexyl)sulfosuccinic acid. Using the conductive polyaniline composition obtained, a thin film was formed in the same manner as in Example 1 and the thin film obtained was evaluated. The results are shown in Tables 1 and 2.

Example 13

A homogeneous conductive polyaniline composition was prepared in the same manner as in Example 1, except that 0.02 g (0.1 mmol) of methanesulfonic acid (manufactured by Wako Pure Chemical Industries. Ltd.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Here, according to the same method as in Example 1, the acidity (pKa) of methanesulfonic acid was −1.5.

Example 14

A homogeneous conductive polyaniline composition was prepared in the same manner as in Example 1, except that 0.04 g (0.2 mmol) of methanesulfonic acid (manufactured by Wako Pure Chemical Industries. Ltd.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Example 15

A homogeneous conductive polyaniline composition was prepared in the same manner as in Example 1, except that 0.08 g (0.4 mmol) of methanesulfonic acid (manufactured by Wako Pure Chemical Industries. Ltd.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Example 16

A homogeneous conductive polyaniline composition was prepared in the same manner as in Example 1, except that 0.058 g (0.21 mmol) of dodecylphosphoric acid (Phosphanol ML200, manufactured by DAI-ICH KOGYO SEIYAKU CO., LTD.) represented by the following formula was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Here, according to the same method as in Example 1, the acidity (pKa) of dodecylphosphoric acid was 0.84.

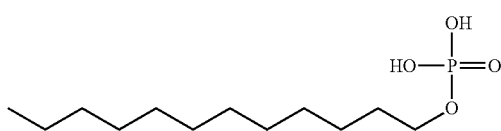 [SMILES: CCCCCCCCCCCCOP(=O)(O)O]

Example 17

A homogeneous conductive polyaniline composition was prepared in the same manner as in Example 1, except that 0.11 g (0.43 mmol) of dodecylphosphoric acid (Phosphanol ML200, manufactured by DAI-ICH KOGYO SEIYAKU CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Example 18

A homogeneous conductive polyaniline composition was prepared in the same manner as in Example 1, except that 0.094 g (0.42 mmol) of 2-naphthalenesulfonic acid hydrate (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Here, according to the same method as in Example 1, the acidity (pKa) of 2-naphthalenesulfonic acid was measured and found to be −2.4.

Example 19

A homogeneous conductive polyaniline composition was prepared in the same manner as in Example 1, except that 0.187 g (0.83 mmol) of 2-naphthalenesulfonic acid hydrate (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Example 20

A homogeneous conductive polyaniline composition was prepared in the same manner as in Example 1, except that 0.08 g (0.43 mmol) of p-xylenesulphonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Here, according to the same method as in Example 1, the acidity (pKa) of p-xylenesulphonic acid was measured and found to be −1.8.

Example 21

A homogeneous conductive polyaniline composition was prepared in the same manner as in Example 1, except that 0.16 g (0.86 mmol) of p-xylenesulphonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Example 22

A homogeneous conductive polyaniline composition was prepared in the same manner as in Example 1, except that 0.05 g (0.41 mmol) of benzoic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Here, according to the same method as in Example 1, the acidity (pKa) of benzoic acid was 4.3.

Example 23

A homogeneous conductive polyaniline composition was prepared in the same manner as in Example 1, except that 0.1 g (0.82 mmol) of benzoic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Example 24

A homogeneous conductive polyaniline composition was prepared in the same manner as in Example 1, except that 0.05 g (0.39 mmol) of cyclohexanecarboxylic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Here, according to the same method as in Example 1, the acidity (pKa) of cyclohexanecarboxylic acid was measured and found to be 4.6.

Example 25

A homogeneous conductive polyaniline composition was prepared in the same manner as in Example 1, except that 0.1 g (0.78 mmol) of cyclohexanecarboxylic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Example 26

A homogeneous conductive polyaniline composition was prepared in the same manner as in Example 1, except that 0.08 g (0.42 mmol) of p-toluenesulphonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Here, according to the same method as in Example 1, the acidity (pKa) of p-toluensulphonic acid was measured and found to be −2.2.

Example 27

A homogeneous conductive polyaniline composition was prepared in the same manner as in Example 1, except that 0.16 g (0.84 mmol) of p-toluenesulphonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Example 28

A homogeneous conductive polyaniline composition was prepared in the same manner as in Example 1, except that 0.065 g (0.41 mmol) of phenylphosphonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Here, according to the same method as in Example 1, the acidity (pKa) of phenylphosphonic acid was measured and found to be 2.2.

Example 29

A homogeneous conductive polyaniline composition was prepared in the same manner as in Example 1, except that 0.13 g (0.82 mmol) of phenylphosphonic acid (manufactured by TOKYO CHEMICAL INDUSTRY CO., LTD.) was added instead of di(2-ethylhexyl)sulfosuccinate.

Using the conductive polyaniline composition obtained, a thin film was formed in the same manner as in Example 1 and the thin film obtained was evaluated. The results are shown in Tables 1 and 2.

Example 30

A homogeneous conductive polyaniline composition was prepared in the same manner as in Example 1, except that 0.08 g (0.43 mmol) of m-xylenesulfonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 1 and 2.

Here, according to the same method as in Example 1, the acidity (pKa) of m-xylenesulfonic acid was measured and found to be −2.0.

Example 31

A homogeneous conductive polyaniline composition was prepared in the same manner as in Example 1, except that 0.16 g (0.86 mmol) of m-xylenesulfonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Example 32

A homogeneous conductive polyaniline composition was prepared in the same manner as in Example 1, except that 0.046 g (0.42 mmol) of ethanesulfonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Here, according to the same method as in Example 1, the acidity (pKa) of ethanesulfonic acid was measured and found to be was −2.6.

Example 33

A homogeneous conductive polyaniline composition was prepared in the same manner as in Example 1, except that 0.091 g (0.83 mmol) of ethanesulfonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Example 34

A homogeneous conductive polyaniline composition was prepared in the same manner as in Example 1, except that 0.135 g (0.41 mmol) of dodecylbenzenesulfonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Here, according to the same method as in Example 1, the acidity (pKa) of dodecylbenzenesulfonic acid measured and found to be −2.8.

Example 35

A homogeneous conductive polyaniline composition was prepared in the same manner as in Example 1, except that 0.27 g (0.83 mmol) of dodecylbenzenesulfonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Example 36

A homogeneous conductive polyaniline composition was prepared in the same manner as in Example 1, except that 0.13 g (0.40 mmol) of bis(2-ethylhexyl)hydrogen phosphate (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Here, according to the same method as in Example 1, the acidity (pKa) of bis(2-ethylhexyl)hydrogen phosphate was measured and found to be 1.2.

Example 37

A homogeneous conductive polyaniline composition was prepared in the same manner as in Example 1, except that 0.27 g (0.84 mmol) of bis(2-ethylhexyl)hydrogen phosphate (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Example 38

A homogeneous conductive polyaniline composition was prepared in the same manner as in Example 1, except that 0.10 g (0.40 mmol) of 8-ethoxyquinoline-5-sulfonic acid hydrate (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Here, according to the same method as in Example 1, the acidity (pKa) of 8-ethoxyquinoline-5-sulfonic acid hydrate was measured and found to be −2.1.

Example 39

A homogeneous conductive polyaniline composition was prepared in the same manner as in Example 1, except that 0.21 g (0.83 mmol) of 8-ethoxyquinoline-5-sulfonic acid hydrate (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Example 40

A homogeneous conductive polyaniline composition was prepared in the same manner as in Example 1, except that 0.06 g (0.42 mmol) of 2-ethylhexanoic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Here, according to the same method as in Example 1, the acidity (pKa) of 2-ethylhexanoic acid was measured and found to be 4.5.

Example 41

A homogeneous conductive polyaniline composition was prepared in the same manner as in Example 1, except that 0.12 g (0.83 mmol) of 2-ethylhexanoic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Example 42

A homogeneous conductive polyaniline composition was prepared in the same manner as in Example 1, except that 0.06 g (0.43 mmol) of salicylic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Here, according to the same method as in Example 1, the acidity (pKa) of salicylic acid was measured and found to be 3.5.

Example 43

A homogeneous conductive polyaniline composition was prepared in the same manner as in Example 1, except that 0.12 g (0.87 mmol) of salicylic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Example 44

A homogeneous conductive polyaniline composition was prepared in the same manner as in Example 1, except that 0.075 g (0.41 mmol) of undecenoic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Here, according to the same method as in Example 1, the acidity (pKa) of undecenoic acid was measured and found to be 4.6.

Example 45

A homogeneous conductive polyaniline composition was prepared in the same manner as in Example 1, except that 0.15 g (0.81 mmol) of undecenoic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Example 46

A homogeneous conductive polyaniline composition was prepared in the same manner as in Example 1, except that 0.072 g (0.41 mmol) of p-phenolsulfonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Here, according to the same method as in Example 1, the acidity (pKa) of p-phenolsulfonic acid was measured and found to be −2.2.

Example 47

A homogeneous conductive polyaniline composition was prepared in the same manner as in Example 1, except that 0.144 g (0.83 mmol) of p-phenolsulfonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Example 48

A homogeneous conductive polyaniline composition was prepared in the same manner as in Example 1, except that 0.129 g (0.41 mmol) of anthraquinonesulfonic acid Na (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Here, according to the same method as in Example 1, the acidity (pKa) of anthraquinonesulfonic acid was measured and found to be −0.89.

Example 49

A homogeneous conductive polyaniline composition was prepared in the same manner as in Example 1, except that 0.259 g (0.83 mmol) of anthraquinonesulfonic acid Na (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Example 50

A homogeneous conductive polyaniline composition was prepared in the same manner as in Example 1, except that 0.104 g (0.41 mmol) of monoisopropyl naphthalenesulfonic acid obtained in Production Example 4 was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Here, according to the same method as in Example 1, the acidity (pKa) of monoisopropyl naphthalenesulfonic acid was measured and found to be −2.3.

Example 51

A homogeneous conductive polyaniline composition was prepared in the same manner as in Example 1, except that 0.207 g (0.83 mmol) of monoisopropyl naphthalenesulfonic acid obtained in Production Example 4 was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Example 52

A homogeneous conductive polyaniline composition was prepared in the same manner as in Example 1, except that 0.121 g (0.41 mmol) of diisopropyl naphthalenesulfonic acid obtained in Production Example 5 was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Here, according to the same method as in Example 1, the acidity (pKa) of diisopropyl naphthalenesulfonic acid was measured and found to be −2.2.

Example 53

A homogeneous conductive polyaniline composition was prepared in the same manner as in Example 1, except that 0.242 g (0.83 mmol) of diisopropyl naphthalenesulfonic acid obtained in Production Example 5 was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Example 54

A homogeneous conductive polyaniline composition was prepared in the same manner as in Example 1, except that 0.139 g (0.41 mmol) of triisopropyl naphthalenesulfonic acid obtained in Production Example 6 was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Here, according to the same method as in Example 1, the acidity (pKa) of triisopropyl naphthalenesulfonic acid was measured and found to be −2.1.

Example 55

A homogeneous conductive polyaniline composition was prepared in the same manner as in Example 1, except that 0.277 g (0.83 mmol) of triisopropyl naphthalenesulfonic acid obtained in Production example 6 was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Example 56

A homogeneous conductive polyaniline composition was prepared in the same manner as in Example 1, except that 0.084 g (0.41 mmol) of 3-nitrobenzenesulfonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Here, according to the same method as in Example 1, the acidity (pKa) of 3-nitrobenzenesulfonic acid was measured and found to be −2.8.

Example 57

A homogeneous conductive polyaniline composition was prepared in the same manner as in Example 1, except that 0.168 g (0.83 mmol) of 3-nitrobenzenesulfonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Example 58

A homogeneous conductive polyaniline composition was prepared in the same manner as in Example 1, except that 0.128 g (0.41 mmol) of 2-hydroxy-4-benzophenone-5-sulfonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Here, according to the same method as in Example 1, the acidity (pKa) of 2-hydroxy-4-benzophenone-5-sulfonic acid was measured and found to be −2.8.

Example 59

A homogeneous conductive polyaniline composition was prepared in the same manner as in Example 1, except that 0.255 g (0.83 mmol) of 2-hydroxy-4-benzophenone-5-sulfonic acid (manufactured by TOKYO CHEMICAL INDUSTRY CO., LTD.) was added instead of di(2-ethylhexyl)sulfosuccinic acid.

Using the conductive polyaniline composition obtained, a thin film was formed in the same manner as in Example 1 and the thin film obtained was evaluated. The results are shown in Tables 3 and 4.

Comparative Example 1

A homogeneous conductive polyaniline composition was prepared in the same manner as in Example 1, except that di(2-ethylhexyl)sulfosuccinic acid was not added.

Using the conductive polyaniline composition obtained, a thin film was formed in the same manner as in Example 1 and the thin film obtained was evaluated. The results are shown in Tables 3 and 4.

Comparative Example 2

A homogeneous conductive polyaniline composition was prepared in the same manner as in Example 1, except that di(2-ethylhexyl)sulfosuccinic acid and m-cresol were not added.

Using the conductive polyaniline composition obtained, a thin film was formed in the same manner as in Example 1 and the thin film obtained was evaluated. The results are shown in Tables 3 and 4.

TABLE 1

| | Elapsed days (days) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Example 1 | 1 | 1.53 | — | — | 2.95 | 3.33 | 2.87 | 4.67 | — | — | — | — | — | — | 12.6 | — |
| Example 2 | 1 | 1.66 | — | — | 3.11 | 3.48 | 4.1 | 5.22 | — | — | — | — | — | — | 13.8 | — |
| Example 3 | 1 | 1.25 | — | — | 1.29 | 1.29 | 1.23 | 1.37 | — | — | — | — | — | — | 1.63 | — |
| Example 4 | 1 | 1.04 | 1.13 | 1.19 | — | — | 1.24 | 1.24 | — | — | 1.35 | — | — | — | 1.42 | — |
| Example 5 | 1 | 1.64 | 2.04 | — | — | 3.77 | 4.2 | 4.87 | — | — | — | — | — | — | 11.97 | — |

TABLE 1-continued

| | Elapsed days (days) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Example 6 | 1 | 1.64 | 1.95 | — | — | 3.04 | 3.4 | 3.89 | — | — | — | — | — | — | 7.76 | — |
| Example 7 | 1 | 1.5 | 1.79 | — | — | 3.05 | 3.28 | 3.71 | — | — | — | — | — | — | 6.92 | — |
| Example 8 | 1 | — | — | 1.29 | 1.34 | 1.21 | 1.5 | 1.57 | — | — | 1.79 | — | — | — | 2.16 | — |
| Example 9 | 1 | 0.96 | 1.05 | 0.94 | 1.02 | — | — | 1.34 | — | — | 1.54 | — | — | — | 1.94 | — |
| Example 10 | 1 | 1.56 | 1.96 | 2.36 | — | — | 3.95 | 4.91 | — | — | 6.67 | — | — | — | 9.55 | — |
| Example 11 | 1 | 1.33 | 1.68 | 1.98 | — | — | 3.02 | 3.23 | — | — | 4.8 | — | — | — | 7.48 | — |
| Example 12 | 1 | 1.38 | 1.76 | 2 | — | — | 3.08 | 3.29 | — | — | 5.02 | — | — | — | 7.82 | — |
| Example 13 | 1 | 1.25 | — | — | 2.13 | 2.37 | 2.42 | 2.92 | — | — | — | — | — | — | 3.96 | — |
| Example 14 | 1 | 1.34 | — | — | 2.47 | 2.78 | 2.78 | 3.37 | — | — | — | — | — | — | 4.49 | — |
| Example 15 | 1 | 1.52 | — | — | 2.46 | 2.69 | 2.77 | 3.21 | — | — | — | — | — | — | 4.15 | — |
| Example 16 | 1 | 1.12 | 1.17 | 1.3 | — | — | — | 1.43 | — | — | 1.48 | — | — | — | — | — |
| Example 17 | 1 | 1.02 | 1.05 | 1.16 | — | — | 1.25 | 1.27 | — | — | 1.3 | — | — | — | — | — |
| Example 18 | 1 | 0.76 | — | — | 0.94 | — | — | — | 1.05 | — | — | 1.12 | — | — | — | 1.21 |
| Example 19 | 1 | — | — | 1.12 | — | — | — | 1.16 | — | — | 1.22 | — | — | — | 1.31 | — |
| Example 20 | 1 | 0.77 | 0.80 | — | — | — | — | — | — | 1.06 | — | — | 1.19 | — | — | — |
| Example 21 | 1 | 0.96 | 1.02 | — | — | — | — | — | — | 1.36 | — | — | 1.52 | — | — | — |
| Example 22 | 1 | 1.26 | — | 1.56 | — | — | 2.04 | — | — | — | 2.62 | — | — | 3.13 | — | — |
| Example 23 | 1 | 1.25 | — | 1.54 | — | — | 2.02 | — | — | — | 2.58 | — | — | 3.05 | — | — |
| Example 24 | 1 | 1.26 | 1.40 | — | — | 1.80 | — | — | — | 2.27 | — | — | 2.56 | — | — | — |
| Example 25 | 1 | 1.27 | 1.42 | — | — | 1.83 | — | — | — | 2.29 | — | — | 2.64 | — | — | — |
| Example 26 | 1 | 1.05 | — | — | 1.25 | — | — | — | 1.39 | — | — | 1.62 | — | — | — | 1.91 |
| Example 27 | 1 | 1.06 | — | — | 1.21 | — | — | — | 1.30 | — | — | 1.48 | — | — | — | 1.71 |
| Example 28 | 1 | 0.92 | — | — | 1.99 | — | — | — | 2.57 | — | — | 3.32 | — | — | — | 4.46 |
| Example 29 | 1 | 1.29 | — | — | 0.95 | — | — | — | 1.09 | — | — | 1.19 | — | — | — | 1.33 |
| Example 30 | 1 | 1.10 | 1.21 | — | — | — | — | — | — | 1.72 | — | — | 1.89 | — | — | — |

TABLE 2

| | Elapsed days (days) | | | | | | | | | | | | | | | | |
|---|---|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 31 | 32 | |
| Example 1 | — | — | — | — | 22.1 | — | — | — | — | — | — | — | — | — | — | — | |
| Example 2 | — | — | — | — | 21.7 | — | — | — | — | — | — | — | — | — | — | — | |
| Example 3 | — | — | — | — | 1.67 | — | — | — | — | — | — | — | — | — | — | 2.04 | |
| Example 4 | — | — | — | — | 1.66 | — | — | — | — | — | — | — | — | — | 2.04 | — | |
| Example 5 | — | — | — | — | 22.95 | — | — | — | — | — | — | — | — | — | — | — | |
| Example 6 | — | — | — | — | 12.51 | — | — | — | — | — | — | — | — | — | — | — | |
| Example 7 | — | — | — | — | 10.73 | — | — | — | — | — | — | — | — | — | — | — | |
| Example 8 | — | — | — | — | 2.68 | — | — | — | — | — | — | — | — | — | 4.28 | — | |
| Example 9 | — | — | — | — | — | — | — | — | — | — | — | — | — | — | — | — | |
| Example 10 | — | — | — | — | — | — | — | — | — | — | — | — | — | — | 32.6 | — | |
| Example 11 | — | — | — | — | — | — | — | — | — | — | — | — | — | — | 25.95 | — | |
| Example 12 | — | — | — | — | — | — | — | — | — | — | — | — | — | — | 32.2 | — | |
| Example 13 | — | — | — | — | — | — | — | — | — | — | — | — | — | — | — | — | |
| Example 14 | — | — | — | — | — | — | — | — | — | — | — | — | — | — | — | — | |
| Example 15 | — | — | — | — | — | — | — | — | — | — | — | — | — | — | — | — | |
| Example 16 | — | — | — | — | — | — | — | — | — | — | — | — | — | — | — | — | |
| Example 17 | — | — | — | — | — | — | — | — | — | — | — | — | — | — | — | — | |
| Example 18 | — | — | 1.30 | — | — | — | 1.39 | — | — | — | — | — | — | — | 1.60 | — | |
| Example 19 | — | 1.36 | — | — | — | 1.42 | — | — | — | — | — | — | — | 1.56 | — | — | |
| Example 20 | 1.40 | — | — | 1.57 | — | — | 1.84 | — | — | — | 2.05 | — | — | — | — | — | |
| Example 21 | 1.74 | — | — | 1.92 | — | — | 2.15 | — | — | — | 2.34 | — | — | — | — | — | |
| Example 22 | — | 3.82 | — | — | 4.35 | — | 4.87 | — | — | — | — | — | — | — | — | — | |
| Example 23 | — | 3.68 | — | — | 4.18 | — | 4.66 | — | — | — | — | — | — | — | — | — | |
| Example 24 | 2.96 | — | — | 3.30 | — | — | 3.58 | — | — | — | — | — | — | — | — | — | |
| Example 25 | 3.08 | — | — | 3.41 | — | — | 3.70 | — | — | — | — | — | — | — | — | — | |
| Example 26 | — | — | 2.41 | — | — | — | 2.68 | — | — | — | — | — | — | — | 3.52 | — | |
| Example 27 | — | — | 1.85 | — | — | — | 2.04 | — | — | — | — | — | — | — | 2.47 | — | |
| Example 28 | — | — | 5.33 | — | — | — | 6.54 | — | — | — | — | — | — | — | 9.40 | — | |
| Example 29 | — | — | 1.46 | — | — | — | 1.63 | — | — | — | — | — | — | — | 2.08 | — | |
| Example 30 | 2.13 | — | — | — | — | — | — | 2.56 | — | — | 2.76 | — | — | — | — | — | |

TABLE 3

| | \multicolumn{16}{c}{Elapsed days (days)} | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Example 31 | 1 | 1.31 | 1.46 | — | — | — | — | — | — | 2.48 | — | — | 2.91 | — | — | — |
| Example 32 | 1 | 2.05 | — | — | 2.72 | — | 3.11 | — | 3.69 | — | — | 4.74 | — | 5.36 | — | 6.62 |
| Example 33 | 1 | 3.04 | — | — | 2.67 | — | 2.91 | — | 3.29 | — | — | 4.07 | — | 4.35 | — | 5.22 |
| Example 34 | 1 | 1.25 | — | — | — | 1.97 | — | 2.21 | — | — | 2.37 | — | — | 2.83 | — | — |
| Example 35 | 1 | 1.14 | — | — | — | 1.51 | — | 1.69 | — | — | 1.87 | — | — | 2.28 | — | — |
| Example 36 | 1 | 1.18 | 1.16 | — | — | 1.30 | — | — | — | 1.47 | — | — | — | — | — | — |
| Example 37 | 1 | 1.14 | 1.12 | — | — | 1.25 | — | — | — | 1.39 | — | — | — | — | — | — |
| Example 38 | 1 | — | — | 1.27 | — | — | — | 1.49 | — | — | — | — | — | — | 2.08 | — |
| Example 39 | 1 | 1.15 | — | — | 1.37 | — | — | — | 1.61 | — | — | — | — | — | — | 1.97 |
| Example 40 | 1 | 1.27 | — | 1.58 | — | — | 2.07 | — | — | — | 2.65 | — | — | 3.13 | — | — |
| Example 41 | 1 | 1.26 | — | 1.55 | — | — | 1.98 | — | — | — | 2.58 | — | — | 3.04 | — | — |
| Example 42 | 1 | 1.30 | — | 1.62 | — | — | 2.09 | — | — | — | 2.84 | — | — | 3.35 | — | — |
| Example 43 | 1 | 1.40 | — | 1.89 | — | — | 2.72 | — | — | — | 4.01 | — | — | 4.95 | — | — |
| Example 44 | 1 | 1.29 | 1.47 | — | 1.99 | — | — | — | — | 2.52 | — | — | 2.95 | — | — | — |
| Example 45 | 1 | 1.34 | 1.54 | — | 2.11 | — | — | — | — | 2.78 | — | — | 3.24 | — | — | — |
| Example 46 | 1 | — | — | 0.94 | — | — | — | 0.86 | — | — | — | — | — | — | — | 0.84 |
| Example 47 | 1 | — | — | 0.47 | — | — | — | 0.47 | — | — | — | — | — | — | — | 0.56 |
| Example 48 | 1 | 1.31 | — | 1.72 | — | — | 2.11 | 2.24 | — | — | 2.65 | — | 3.07 | — | 3.23 | — |
| Example 49 | 1 | 1.30 | — | 1.70 | — | — | 2.09 | 2.22 | — | — | 2.61 | — | 3.01 | — | 3.16 | — |
| Example 50 | 1 | 0.89 | — | — | — | 0.80 | 0.80 | 0.81 | 0.82 | — | — | — | — | — | — | — |
| Example 51 | 1 | 0.84 | — | — | — | 0.75 | 0.76 | 0.77 | 0.78 | — | — | — | — | — | — | — |
| Example 52 | 1 | 1.01 | 1.03 | 1.04 | 1.06 | — | — | 1.11 | — | — | 1.15 | 1.16 | — | — | 1.21 | 1.23 |
| Example 53 | 1 | 1.02 | 1.03 | 1.04 | 1.05 | — | — | 1.09 | — | — | 1.12 | 1.13 | — | — | 1.16 | 1.17 |
| Example 54 | 1 | 0.80 | — | — | — | 0.74 | 0.75 | 0.76 | 0.78 | — | — | — | — | — | — | — |
| Example 55 | 1 | 0.69 | — | — | — | 0.66 | — | 0.68 | 0.69 | — | — | — | — | — | — | — |
| Example 56 | 1 | — | 0.96 | — | — | 1.05 | — | 1.10 | 1.12 | 1.14 | — | — | 1.20 | — | — | 1.28 |
| Example 57 | 1 | — | 1.12 | — | — | 1.25 | — | — | 1.36 | 1.40 | — | — | 1.50 | — | — | 1.61 |
| Example 58 | 1 | — | 0.88 | — | — | 0.75 | — | 0.74 | 0.75 | 0.76 | — | — | 0.80 | — | — | 0.84 |
| Example 59 | 1 | — | 0.79 | — | — | 0.79 | — | — | 0.82 | 0.84 | — | — | 0.89 | — | — | 0.95 |
| Com. Ex 1 | 1 | — | — | 2.96 | 3.75 | 4.09 | 4.77 | 5.8 | — | — | 9.26 | — | — | — | 14.1 | — |
| Com. Ex 2 | 1 | 0.91 | — | — | 4.85 | — | — | 6.33 | — | — | 16 | — | — | — | 32.8 | — |

TABLE 4

| | \multicolumn{16}{c}{Elapsed days [days]} | | | | | | | | | | | | | | | |
|---|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 31 | 32 |
| Example 31 | 3.57 | — | — | — | — | — | — | 4.84 | — | — | 5.47 | — | — | — | — | — |
| Example 32 | — | — | 8.15 | — | 8.43 | — | — | — | — | 12.29 | — | — | 14.45 | — | 14.45 | — |
| Example 33 | — | — | 5.96 | — | 5.80 | — | — | — | — | 7.84 | — | — | 8.62 | — | 8.62 | — |
| Example 34 | — | 3.52 | — | — | 4.10 | — | — | — | 5.10 | — | — | 6.03 | — | — | — | — |
| Example 35 | — | 2.98 | — | — | 3.63 | — | — | — | 4.48 | — | — | 5.15 | — | — | — | — |
| Example 36 | 1.88 | — | — | 2.03 | — | — | — | 2.39 | — | — | 2.54 | — | — | — | — | — |
| Example 37 | 1.64 | — | — | 1.74 | — | — | — | 1.98 | — | — | 2.09 | — | — | — | — | — |
| Example 38 | — | 2.24 | — | — | — | 2.56 | — | 2.36 | — | 2.83 | — | — | — | 3.53 | — | — |
| Example 39 | — | — | 2.13 | — | — | — | 2.36 | — | — | 2.55 | — | — | — | — | 2.98 | — |
| Example 40 | — | 3.75 | — | — | 4.23 | — | — | 4.70 | — | — | — | — | — | — | — | — |
| Example 41 | — | 3.64 | — | — | 4.11 | — | — | 4.55 | — | — | — | — | — | — | — | — |
| Example 42 | — | 4.07 | — | — | 4.78 | — | — | 5.34 | — | — | — | — | — | — | — | — |
| Example 43 | — | 6.39 | — | — | 7.83 | — | — | 9.06 | — | — | — | — | — | — | — | — |
| Example 44 | 3.50 | — | — | 3.93 | — | — | 4.31 | — | — | — | — | — | — | — | — | — |
| Example 45 | 3.86 | — | — | 4.32 | — | — | 4.74 | — | — | — | — | — | — | — | — | — |
| Example 46 | — | — | — | — | — | — | — | — | — | 1.12 | — | 1.14 | 1.19 | — | 1.28 | — |
| Example 47 | — | — | — | — | — | — | — | — | — | 0.77 | — | 0.79 | 0.83 | — | 0.91 | — |
| Example 48 | — | — | 3.64 | — | 3.96 | 4.16 | 4.32 | — | — | 4.80 | — | — | 5.48 | — | — | — |
| Example 49 | — | — | 3.55 | — | 3.84 | 4.03 | 4.17 | — | — | 4.61 | — | — | 5.24 | — | — | — |
| Example 50 | — | — | — | — | — | — | — | — | — | — | — | — | — | — | — | — |
| Example 51 | — | — | — | — | — | — | — | — | — | — | — | — | — | — | — | — |
| Example 52 | 1.24 | 1.25 | 1.27 | — | — | 1.32 | 1.34 | 1.36 | — | — | — | — | — | — | — | — |
| Example 53 | 1.18 | 1.19 | 1.21 | — | — | 1.24 | 1.25 | 1.27 | — | — | — | — | — | — | — | — |
| Example 54 | — | — | — | — | — | — | — | — | — | — | — | — | — | — | — | — |
| Example 55 | — | — | — | — | — | — | — | — | — | — | — | — | — | — | — | — |
| Example 56 | 1.30 | — | — | — | 1.42 | 1.45 | 1.49 | 1.52 | — | — | — | — | — | — | — | — |
| Example 57 | 1.64 | — | — | — | 1.78 | 1.82 | 1.86 | 1.89 | — | — | — | — | — | — | — | — |
| Example 58 | 0.85 | — | — | — | 0.93 | 0.95 | 0.98 | 1.00 | — | — | — | — | — | — | — | — |
| Example 59 | 0.97 | — | — | — | 1.06 | 1.08 | 1.11 | 1.13 | — | — | — | — | — | — | — | — |
| Com. Ex. 1 | — | — | — | — | 29.4 | — | — | — | — | — | — | — | — | — | 72.2 | 76.7 |
| Com. Ex. 2 | — | — | — | — | — | — | — | — | — | — | — | — | — | — | — | — |

Example 60

Preparation of Conductive Polyaniline Composition 500 mg of the conductive polyaniline composite obtained in Production example 1 was dissolved in 10 g of toluene again to prepare a homogeneous solution of the conductive polyaniline composite. To this solution, 0.023 g (0.11 mmol) of 2-naphthalenesulfonic acid hydrate (manufactured by TOKYO CHEMICAL INDUSTRY CO., LTD.) and 1 g (9.2 mmol) of m-cresol were added to obtain a homogeneous conductive polyaniline composition.

[Production Of Conductive Polyaniline Thin Film]

About 1 ml of the conductive polyaniline composition obtained was applied on the top surface of a glass substrate 1 (shown in FIG. 1) on which ITO electrode 2 was formed by patterning, specifically spin coating. The application by spin coating was conducted in a nitrogen atmosphere. In the spin coating, a rotation time after dropping of the conductive polyaniline composition onto the glass substrate was 15 seconds. The rotation rate of the glass substrate in the spin coating was set to 500 rpm. After that, the glass substrate was dried to form a conductive polyaniline thin film. Here, the drying was conducted in a nitrogen atmosphere. The drying time and temperature were set to 5 minutes and 80° C., respectively. As shown in FIG. 4, after drying the conductive polyaniline thin film, parts of the conductive polyaniline thin film 5 which cover a terminal of ITO electrode were scraped off in a nitrogen atmosphere to expose the terminal of ITO electrode to the surface. Using the terminal of ITO electrode exposed to the surface, the resistance of the thin film was measured by means of Loresta GP (manufactured by Mitsubishi Chemical Corporation, a resistivity meter using a four probe method), and the resistance value shortly after film formation was set to $R_0$ as a initial value.

[Heat Test at 125° C. of Conductive Polyaniline Thin Film]

The conductive polyaniline composition thin film obtained was left in the form of a glass substrate in a nitrogen atmosphere at a temperature of 125° C. for a predetermined time. After the lapse of a predetermined period of time, the temperature of the thin film was returned to room temperature, and then the resistance was measured in the same manner as in measuring of the initial value $R_0$. The ratio $R/R_0$ of the resistance value R after the lapse of a predetermined period of time to the initial value $R_0$ was calculated to evaluate degradation with time (percentage of rise in resistance) of the thin film. The results are shown in Tables 5 and 6.

Here, values in the Tables indicate the ratio $R/R_0$ of the resistance value R after the lapse of a predetermined period of time to the initial value $R_0$.

Example 61

A homogeneous conductive polyaniline composition was prepared in the same manner as in Example 60, except that the additive amount of 2-naphthalenesulfonic acid hydrate was changed to 0.047 g (0.22 mmol).

Using the conductive polyaniline composition obtained, a thin film was formed in the same manner as in Example 60 and the thin film obtained was evaluated. The results are shown in Tables 5 and 6.

Example 62

A homogeneous conductive polyaniline composition was prepared in the same manner as in Example 60, except that the amount of 2-naphthalenesulfonic acid hydrate was changed to 0.094 g (0.42 mmol).

Using the conductive polyaniline composition obtained, a thin film was formed in the same manner as in Example 60 and the thin film obtained was evaluated. The results are shown in Tables 5 and 6.

Example 63

A homogeneous conductive polyaniline composition was prepared in the same manner as in Example 60, except that the amount of 2-naphthalenesulfonic acid hydrate was changed to 0.38 g (1.8 mmol).

Using the conductive polyaniline composition obtained, a thin film was formed in the same manner as in Example 60 and the thin film obtained was evaluated. The results are shown in Tables 5 and 6.

Example 64

A homogeneous conductive polyaniline composition was prepared in the same manner as in Example 60, except that 0.02 g (0.11 mmol) of p-xylenesulfonic acid (manufactured by TOKYO CHEMICAL INDUSTRY CO., LTD.) was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 65

A homogeneous conductive polyaniline composition was prepared in the same manner as in Example 60, except that 0.04 g (0.22 mmol) of p-xylenesulfonic acid (manufactured by TOKYO CHEMICAL INDUSTRY CO., LTD.) was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 66

A homogeneous conductive polyaniline composition was prepared in the same manner as in Example 60, except that 0.08 g (0.43 mmol) of p-xylenesulfonic acid (manufactured by TOKYO CHEMICAL INDUSTRY CO., LTD.) was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 67

A homogeneous conductive polyaniline composition was prepared in the same manner as in Example 60, except that 0.46 g (2.5 mmol) of p-xylenesulfonic acid (manufactured by TOKYO CHEMICAL INDUSTRY CO., LTD.) was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 68

A homogeneous conductive polyaniline composition was prepared in the same manner as in Example 60, except that 0.2 g (1.6 mmol) of benzoic acid (manufactured by TOKYO CHEMICAL INDUSTRY CO., LTD.) was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 69

A homogeneous conductive polyaniline composition was prepared in the same manner as in Example 60, except that 0.4 g (3.2 mmol) of benzoic acid (manufactured by TOKYO CHEMICAL INDUSTRY CO., LTD.) was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 70

A homogeneous conductive polyaniline composition was prepared in the same manner as in Example 60, except that 0.072 g (0.41 mmol) of p-phenolsulfonic acid (manufactured by TOKYO CHEMICAL INDUSTRY CO., LTD.) was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 71

A homogeneous conductive polyaniline composition was prepared in the same manner as in Example 60, except that 0.144 g (0.83 mmol) of p-phenolsulfonic acid (manufactured by TOKYO CHEMICAL INDUSTRY CO., LTD.) was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 72

A homogeneous conductive polyaniline composition was prepared in the same manner as in Example 60, except that 0.13 g (0.42 mmol) of anthraquinonesulfonic acid Na (manufactured by TOKYO CHEMICAL INDUSTRY CO., LTD.) was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 73

A homogeneous conductive polyaniline composition was prepared in the same manner as in Example 60, except that 0.26 g (0.83 mmol) of anthraquinonesulfonic acid Na (manufactured by TOKYO CHEMICAL INDUSTRY CO., LTD.) was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 74

A homogeneous conductive polyaniline composition was prepared in the same manner as in Example 60, except that 0.104 g (0.41 mmol) of monoisopropyl naphthalenesulfonic acid obtained in Production Example 4 was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 75

A homogeneous conductive polyaniline composition was prepared in the same manner as in Example 60, except that 0.207 g (0.83 mmol) of monoisopropyl naphthalenesulfonic acid obtained in Production example 4 was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 76

A homogeneous conductive polyaniline composition was prepared in the same manner as in Example 60, except that 0.121 g (0.41 mmol) of diisopropyl naphthalenesulfonic acid obtained in Production Example 5 was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 77

A homogeneous conductive polyaniline composition was prepared in the same manner as in Example 60, except that 0.242 g (0.83 mmol) of diisopropyl naphthalenesulfonic acid obtained in Production Example 5 was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 78

A homogeneous conductive polyaniline composition was prepared in the same manner as in Example 60, except that 0.139 g (0.41 mmol) of triisopropyl naphthalenesulfonic acid obtained in Production example 6 was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 79

A homogeneous conductive polyaniline composition was prepared in the same manner as in Example 60, except that 0.277 g (0.83 mmol) of triisopropyl naphthalenesulfonic acid obtained in Production Example 6 was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 80

A homogeneous conductive polyaniline composition was prepared in the same manner as in Example 60, except that 0.06 g (0.43 mmol) of salicylic acid (manufactured by TOKYO CHEMICAL INDUSTRY CO., LTD.) was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 81

A homogeneous conductive polyaniline composition was prepared in the same manner as in Example 60, except that 0.12 g (0.87 mmol) of salicylic acid (manufactured by TOKYO CHEMICAL INDUSTRY CO., LTD.) was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 82

A homogeneous conductive polyaniline composition was prepared in the same manner as in Example 60, except that 0.084 g (0.45 mmol) of 3-nitrobenzenesulfonic acid (manufactured by TOKYO CHEMICAL INDUSTRY CO., LTD.) was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Example 83

A homogeneous conductive polyaniline composition was prepared in the same manner as in Example 60, except that 0.168 g (0.90 mmol) of 3-nitrobenzenesulfonic acid (manufactured by TOKYO CHEMICAL INDUSTRY CO., LTD.) was added instead of 2-naphthalenesulfonic acid hydrate (manufactured by TOKYO CHEMICAL INDUSTRY CO., LTD.).

Using the conductive polyaniline composition obtained, a thin film was formed in the same manner as in Example 60 and the thin film obtained was evaluated. The results are shown in Tables 5 and 6.

Comparative Example 3

A homogeneous conductive polyaniline composition was prepared in the same manner as in Example 60, except that 2-naphthalenesulfonic acid hydrate was not added.

Using the conductive polyaniline composition obtained, a thin film was formed in the same manner as in Example 1 and the thin film obtained was evaluated. The results were as follows: $R/R_0=2$ (elapsed days: 1 day), $R/R_0=8$ (elapsed days: 4 days), $R/R_0=26$ (elapsed days: 6 days), $R/R_0=38$ (elapsed days: 8 days), $R/R_0=88$ (elapsed days: 11 days), $R/R_0=150$ (elapsed days: 13 days), $R/R_0=196$ (elapsed days: 14 days), $R/R_0=246$ (elapsed days: 15 days), $R/R_0=930$ (elapsed days: 21 days), $R/R_0=1126$ (elapsed days: 22 days), $R/R_0=2149$ (elapsed days: 26 days), $R/R_0=2551$ (elapsed days: 27 days), and $R/R_0=3394$ (elapsed days: 28 days).

TABLE 5

| | Initial value | \multicolumn{15}{c}{Elapsed days} |
| | | 1 | 2 | 3 | 4 | 5 | 6 | 7 | 8 | 9 | 10 | 11 | 12 | 13 | 14 | 15 |
| --- | --- | --- | --- | --- | --- | --- | --- | --- | --- | --- | --- | --- | --- | --- | --- | --- |
| Example60 | 1 | 1.27 | 1.45 | — | — | 2.18 | — | — | — | 3.14 | — | — | 3.93 | — | — | — |
| Example61 | 1 | — | 0.72 | — | — | 0.87 | — | — | — | 1.10 | — | — | 1.31 | — | — | — |
| Example62 | 1 | 1.11 | 1.17 | — | — | 1.33 | — | — | 1.84 | — | — | — | — | — | — | — |
| Example63 | 1 | 1.03 | — | — | 1.26 | — | — | — | 1.62 | — | — | 1.93 | — | — | — | 2.34 |
| Example64 | 1 | 1.68 | 2.16 | — | — | 4.48 | — | — | — | 8.71 | — | — | 13.35 | — | — | — |
| Example65 | 1 | 1.78 | 2.38 | — | — | 5.58 | — | — | — | 12.14 | — | — | 19.70 | — | — | — |
| Example66 | 1 | 1.76 | 2.47 | — | — | — | — | — | — | 14.70 | — | — | 26.73 | — | — | — |
| Example67 | 1 | — | 2.00 | — | — | — | — | — | — | — | 8.51 | — | — | 13.50 | — | — |
| Example68 | 1 | — | 2.30 | — | — | — | — | — | — | — | 13.32 | — | — | 25.11 | — | — |
| Example69 | 1 | — | 2.27 | — | — | — | — | — | — | — | 14.01 | — | — | 25.73 | — | — |
| Example70 | 1 | — | — | — | 3.01 | — | — | 6.61 | — | — | — | — | — | — | — | 18.08 |
| Example71 | 1 | — | — | — | 0.8 | — | — | 1.4 | — | — | — | — | — | — | — | 3.4 |
| Example72 | 1 | 1.84 | — | — | 4.73 | — | 10.99 | 13.65 | — | — | 25.82 | — | 51.27 | — | 65.30 |
| Example73 | 1 | 1.6 | — | — | 3.1 | — | — | 5.3 | 6.1 | — | — | 8.9 | — | 13.1 | — | 15.0 |
| Example74 | 1 | 1.0 | — | — | 1.3 | 1.4 | 1.6 | 1.9 | — | — | — | — | — | — | — | — |
| Example75 | 1 | 0.9 | — | — | 1.2 | 1.3 | 1.5 | 1.6 | — | — | — | — | — | — | — | — |
| Example76 | 1 | 1.00 | 1.20 | — | — | 2.26 | 2.78 | 3.49 | 4.77 | 4.84 | — | — | 8.0 | 9.3 | 10.6 | 12.2 |

TABLE 5-continued

|  | Initial value | \multicolumn{15}{c}{Elapsed days} |
| --- | --- | --- | --- | --- | --- | --- | --- | --- | --- | --- | --- | --- | --- | --- | --- | --- |
|  |  | 1 | 2 | 3 | 4 | 5 | 6 | 7 | 8 | 9 | 10 | 11 | 12 | 13 | 14 | 15 |
| Example77 | 1 | 1.04 | — | — | 3.06 | 4.00 | 5.00 | 6.95 | 7.34 | — | — | 12.5 | 15.9 | 16.0 | 17.8 | 19.4 |
| Example78 | 1 | 0.95 | — | — | — | 1.33 | 1.50 | 1.80 | 2.07 | — | — | — | — | — | — | — |
| Example79 | 1 | 0.91 | — | — | — | 1.36 | 1.53 | 1.81 | 2.06 | — | — | — | — | — | — | — |
| Example80 | 1 | 1.74 | — | 3.54 | — | — | 7.36 | — | — | — | 16.6 | — | — | 29.5 | — | — |
| Example81 | 1 | 2.0 | — | 4.8 | — | — | 12.4 | — | — | — | 39 | — | — | 80 | — | — |
| Example82 | 1 | — | 1.36 | — | — | 2.65 | 3.21 | 3.82 | 4.48 | — | — | — | 7.46 | 8.23 | 9.21 | 10.3 |
| Example83 | 1 | — | 1.3 | — | — | 2.4 | 2.8 | 3.3 | 3.9 | — | — | — | 6.2 | 6.7 | 7.4 | 8.2 |

TABLE 6

|  | \multicolumn{14}{c}{Elapsed days} |
| --- | --- | --- | --- | --- | --- | --- | --- | --- | --- | --- | --- | --- | --- | --- |
|  | 16 | 17 | 18 | 19 | 20 | 21 | 22 | 23 | 24 | 25 | 26 | 27 | 29 | 31 | 32 |
| Example 60 | 5.1 | — | — | 6.4 | — | — | — | 7.9 | — | — | 9.4 | — | — | — | — |
| Example 61 | 1.62 | — | — | 1.87 | — | — | — | 2.26 | — | — | 2.57 | — | — | — | — |
| Example 62 | 1.90 | — | — | 2.04 | — | — | — | 2.20 | — | — | 2.32 | — | — | — | — |
| Example 63 | — | — | 2.65 | — | — | — | 3.11 | — | — | 3.48 | — | — | — | — | — |
| Example 64 | 22.14 | — | — | 31.62 | — | — | — | 49.12 | — | — | 65.24 | — | — | — | — |
| Example 65 | 33.88 | — | — | 48.55 | — | — | — | 75.82 | — | — | 102.39 | — | — | — | — |
| Example 66 | 52.65 | — | — | 81.17 | — | — | — | 141.55 | — | — | 206.15 | — | — | — | — |
| Example 67 | — | 21.48 | — | — | 29.12 | — | — | — | 41.20 | — | — | 51.93 | — | — | — |
| Example 68 | — | 50.15 | — | — | 78.37 | — | — | — | 127.18 | — | — | 173.94 | — | — | — |
| Example 69 | — | 50.18 | — | — | 79.69 | — | — | — | 134.30 | — | — | 188.92 | — | — | — |
| Example 70 | — | — | — | 31.19 | 40.95 | 39.38 | 48.86 | — | — | 57.70 | 63.95 | 71.71 | — | — | — |
| Example 71 | — | — | — | 5.4 | 6.7 | 6.6 | 8.1 | — | — | 9.2 | 9.9 | 11.1 | — | — | — |
| Example 72 | — | — | 110.02 | — | 154.58 | 180.96 | 205.30 | — | — | 300.23 | — | — | 471.19 | — | — |
| Example 73 | — | — | 20.9 | — | 26.5 | 29.8 | 32.9 | — | — | 44.4 | — | — | 63.5 | — | — |
| Example 74 | — | — | — | — | — | — | — | — | — | — | — | — | — | — | — |
| Example 75 | — | — | — | — | — | — | — | — | — | — | — | — | — | — | — |
| Example 76 | 16.9 | — | — | 21.2 | — | — | — | — | — | — | — | — | — | — | — |
| Example 77 | — | — | 30.2 | — | — | — | — | — | — | — | — | — | — | — | — |
| Example 78 | — | — | — | — | — | — | — | — | — | — | — | — | — | — | — |
| Example 79 | — | — | — | — | — | — | — | — | — | — | — | — | — | — | — |
| Example 80 | — | 58.3 | — | — | 92.6 | — | — | 134.5 | — | — | — | — | — | 332.3 | — |
| Example 81 | — | 176 | — | — | 296 | — | — | 450 | — | — | — | — | — | 1168 | — |
| Example 82 | — | — | — | 16.3 | 18.1 | 20.1 | 22.1 | — | — | — | — | — | — | — | — |
| Example 83 | — | — | — | 11.8 | 12.8 | 13.8 | 14.8 | — | — | — | — | — | — | — | — |

INDUSTRIAL APPLICABILITY

The molded article obtained from the π-conjugated polymer composition of the invention can be used for antistatic materials, materials for a transparent electrode and conductive film, materials for an electroluminescence device, circuit materials, materials for blocking electromagnetic wave, dielectric materials of condensers and electrolytes, electrode materials of a solar cell and secondary battery, materials for a fuel cell separator and the like, or can be used as a foundation for coating, an anti-corrosive material and the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification are incorporated herein by reference in its entirety.

The invention claimed is:

1. A π-conjugated polymer composition, comprising:
   (a) a solvent;
   (b) a π-conjugated polymer dissolved in the solvent and doped with a dopant;
   (c) an acidic substance, a salt of an acidic substance, or both; and
   (d) a phenolic compound;
   wherein
   when the composition comprises only the acidic substance as the component (c), then the acidic substance is different from the phenolic compound (d) and is different from the dopant,
   when the composition comprises only the salt of an acidic substance as the component (c), then the salt of an acidic substance is different from the phenolic compound (d) and is different from the dopant, and
   when the composition comprises both the acidic substance and the salt of an acidic substance as the component (c), then at least one of the acidic substance and the salt of an acidic substance is different from the phenolic compound (d) and at least one of the acidic substance and the salt of an acidic substance is different from the dopant.

2. The composition of claim 1, wherein:
   when the composition comprises only the acidic substance as the component (c), then the acidic substance has an acidity of 5.0 or less;
   when the composition comprises only the salt of an acidic substance as the component (c), then the acidic substance of the salt has an acidity of 5.0 or less; and
   when the composition comprises both the acidic substance and the salt of an acidic substance as the component (c), then the acidic substance has an acidity of 5.0 or less, the acidic substance of the salt has an acidity of 5.0 or less, or both the acidic substance and the acidic substance of the salt have acidities of 5.0 or less.

3. The composition of claim 1, wherein:
the π-conjugated polymer comprises a nitrogen atom;
the dopant is a sulfonic acid;
when the composition comprises only the acidic substance as the component (c), then the acidic substance is a sulfonic acid, which is different from the dopant;
when the composition comprises only the salt of an acidic substance as the component (c), then the salt of an acidic substance is a salt of a sulfonic acid, which is different from the dopant;
when the composition comprises the acidic substance and the salt of an acidic substance as the component (c), then at least one of the acidic substance and the salt of an acidic substance is a sulfonic acid or a salt of a sulfonic acid, which is different from the dopant; and
the following formula (1) is satisfied:

$$0.21 \leq S_1/N_1 \leq 1.2 \tag{1}$$

wherein $S_1$ is the mole number of sulfur atoms contained in the composition and $N_1$ is the mole number of nitrogen atoms contained in the composition.

4. The composition of claim 1, wherein
the π-conjugated polymer comprises a nitrogen atom;
the dopant is a sulfonic acid;
when the composition comprises only the acidic substance as the component (c), then the acidic substance is a sulfonic acid which is different from the dopant;
when the composition comprises only the salt of an acidic substance as the component (c), then the salt of an acidic substance is a salt of a sulfonic acid, which is different from the dopant;
when the composition comprises the acidic substance and the salt of an acidic substance as the component (c), then at least one of the acidic substance and the salt of an acidic substance is a sulfonic acid or a salt of a sulfonic acid which is different from the dopant;
when the composition comprises only the acidic substance as the component (c), then the formula (2) is satisfied:

$$0.01 \leq S_2/N_2 \leq 0.5 \tag{2};$$

when the composition comprises only the salt of an acidic substance as the component (c), then the formula (3) is satisfied:

$$0.01 \leq S_3/N_3 \leq 0.5 \tag{3};$$

when the composition comprises the acidic substance and the salt of an acidic substance as the component (c), then the formula (4) is satisfied:

$$0.01 \leq S_4/N_4 \leq 0.5 \tag{4};$$

$S_2$ is a total mole number of sulfur atoms contained in the acidic substance;
$S_3$ is a total mole number of sulfur atoms contained in the salt of an acidic substance;
$S_4$ is a total mole number of sulfur atoms contained in the acidic substance and the salt of an acidic substance; and
$N_2$ to $N_4$ independently represent a total mole number of nitrogen atoms of the π-conjugated polymer doped with the dopant.

5. The composition of claim 1, wherein
the π-conjugated polymer comprises a nitrogen atom,
the dopant is a sulfonic acid,
formula (5) is satisfied:

$$0.2 \leq S_5 \leq 0.7 \tag{5},$$

$S_5$ is a total mole number of sulfur atoms of the π-conjugated polymer doped with the dopant, and
$N_5$ is a total mole number of nitrogen atoms of the π-conjugated polymer doped with the dopant.

6. The composition of claim 1, wherein
a conductivity measured by a four probe method of a molded article of the π-conjugated polymer, which is doped with the dopant, is 0.01 S/cm or more, and
the molded article is obtained by applying 1 ml of a solution obtained by dissolving 500 mg of the π-conjugated polymer doped with the dopant in 10 g of toluene by spin coating at 500 rpm for 15 seconds in a nitrogen atmosphere on a glass substrate with a patterned indium tin oxide electrode thereon, followed by drying at 80° C. for 5 minutes in a nitrogen atmosphere.

7. The composition of claim 1, wherein a conductivity measured by a four probe method of a molded article is 0.01 S/cm or more, and
the molded article is obtained by applying 1 ml of the π-conjugated polymer composition by spin coating at 500 rpm for 15 seconds in a nitrogen atmosphere on a glass substrate with a patterned indium tin oxide electrode thereon, followed by drying at 80° C. for 5 minutes in a nitrogen atmosphere.

8. The composition of claim 1, wherein the composition comprises a doped α-conjugated polymer comprising a substituted or unsubstituted polyaniline which is protonated.

9. The composition of claim 1, wherein the acidic substance is an organic acid.

10. The composition of claim 1, wherein the acidic substance or the salt of an acidic substance comprises at least one acidic group selected from the group consisting of a sulfonic acid group, a phosphoric acid group, a phosphonic acid group, a carboxy group, and one or more salts thereof.

11. The composition of claim 1, wherein the acidic substance is a cyclic, linear or branched aliphatic carboxylic acid comprising one or more acidic groups.

12. The composition of claim 1, wherein:
the phenolic compound is represented by formula (VII):

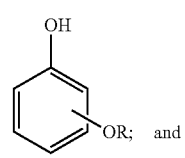

(VII)

R is an alkyl group having 1 to 20 carbon atoms, an alkenyl group having 1 to 20 carbon atoms, a cycloalkyl group having 1 to 20 carbon atoms, an alkylthio group having 1 to 20 carbon atoms, an aryl group having 1 to 20 carbon atoms, an alkylaryl group having 1 to 20 carbon atoms or an arylalkyl group having 1 to 20 carbon atoms.

13. The composition of claim 1, wherein:
the phenolic compound is represented by formula (VIII):

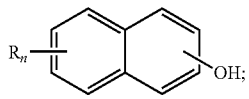

(VIII)

n is an integer of 0 to 6; and
R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms, an aryl group having 6 to 20 carbon atoms, an alkylaryl group having 6 to 20 carbon atoms or an arylalkyl group having 6 to 20 carbon atoms.

14. The composition of claim 1, wherein:
the phenolic compound is represented by formula (IV):

(IV)

n is an integer of 1 to 5; and
R is independently an alkyl group having 2 to 10 carbon atoms, an alkenyl group having 2 to 10 carbon atoms, an alkylthio group having 2 to 10 carbon atoms, a cycloalkyl group having 3 to 10 carbon atoms, an aryl group having 6 to 20 carbon atoms, an alkylaryl group having 6 to 20 carbon atoms or an arylalkyl group having 6 to 20 carbon atoms.

15. The composition of claim 1, wherein the acidic substance is a cyclic, chain, or branched alkylsulfonic acid comprising a sulfonic acid group, or a substituted or unsubstituted aromatic sulfonic acid or polysulfonic acid comprising a sulfonic acid group.

16. The composition of claim 1, wherein the acidic substance is a sulfonic acid comprising a benzene ring, a sulfonic acid comprising a naphthalene skeleton, or a sulfonic acid comprising an anthracene skeleton.

17. The composition of claim 1, wherein the acidic substance is a substituted or unsubstituted benzenesulfonic acid, a substituted or unsubstituted naphthalenesulfonic acid, or a substituted or unsubstituted anthracenesulfonic acid.

18. The composition of claim 1, wherein the acidic acid is polystyrene sulfonic acid.

19. The composition of claim 1, wherein the acidic acid or the salt of the acidic acid is methanesulfonic acid, ethanesulfonic acid, di(2-ethylhexyl)sulfosuccinic acid protonated di(2-ethylhexyl)sulfosuccinic acid, sodium di(2-ethylhexyl)sulfosuccinate, aniline salt of di(2-ethylhexyl)sulfosuccinic acid, protonated monoisopropyl naphthalenesulfonic acid, protonated diisopropyl naphthalenesulfonic acid, protonated triisopropyl naphthalenesulfonic acid, 2-naphthalenesulfonic acid hydrate, p-xylenesulfonic acid, p-toluenesulfonic acid, m-xylenesulfonic acid, dodecylbenzenesulfonic acid, 8-ethoxyquinoline-5-sulfonic acid hydrate, anthraquinonesulfonic acid Na, 3-nitrobenzenesulfonic acid, 2-hydroxy-4-benzophenone-5-sulfonic acid, p-phenolsulfonic acid, dodecylphosphoric acid, bis(2-ethylhexyl)hydrogen phosphate, phenylphosphonic acid, benzoic acid, cyclohexanecarboxylic acid, 2-ethylhexanoic acid, salicylic acid, or undecenoic acid.

20. The composition of claim 1, wherein the composition comprises a doped π-conjugated polymer comprising a substituted or unsubstituted polyaniline which is protonated by a sulfonic acid.

21. The composition of claim 20, wherein:
the sulfonic acid is a sulfosuccinic acid derivative represented by formula (VI):

$$M(O_3SCH(CH_2COOR^{12})COOR^{13})_m$$ (VI)

M is a hydrogen atom, an organic free radical or an inorganic free radical;
m is a valency of M;
$R^{12}$ and $R^{13}$ are independently a hydrocarbon group or a group represented by $—(R^{14}O)_r—R^{15}$;
$R^{14}$ is a hydrocarbon group or a silylene group;
$R^{15}$ is a hydrogen atom, a hydrocarbon group or a group represented by $R^{16}{}_3Si—$;
$R^{16}$ is a hydrocarbon group and three $R^{16}$s may be the same or different; and
r is an integer of 1 or more.

22. The composition of claim 1, wherein the acidic substance is a substituted or unsubstituted aromatic acid comprising one or more acidic groups.

23. The composition of claim 22, wherein the aromatic acid further comprises a naphthalene skeleton.

24. A π-conjugated polymer composition, comprising:
a doped π-conjugated polymer,
an acidic substance or a salt of an acidic substance, and
a phenolic compound,
wherein
the doped π-conjugated polymer is a substituted or unsubstituted polyaniline, which is protonated by a sulfosuccinic acid derivative, and
the acidic substance is an acid comprising a sulfonic acid group and a naphthalene skeleton.

25. A capacitor, comprising the π-conjugated polymer composition of claim 1.

26. A conductive molded article obtained by shaping the π-conjugated polymer composition of claim 1.

27. A conductive film obtained by forming into a film the π-conjugated polymer composition of claim 1.

28. A surface-conductive product obtained by applying the π-conjugated polymer composition of claim 1 to a substrate.

29. The surface-conductive product of claim 28, wherein the substrate is a resin film.

30. A conductive product obtained by mixing the π-conjugated polymer composition of claim 1 and a substrate.

* * * * *